United States Patent
Luo et al.

(10) Patent No.: US 11,025,342 B2
(45) Date of Patent: Jun. 1, 2021

(54) CAMERA COMMUNICATION METHOD AND APPARATUS

(71) Applicant: HUAWEI TECHNOLOGIES CO., LTD., Shenzhen (CN)

(72) Inventors: Pengfei Luo, Beijing (CN); Tong Jiang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/922,412

(22) Filed: Jul. 7, 2020

(65) Prior Publication Data

US 2020/0336207 A1 Oct. 22, 2020

Related U.S. Application Data

(63) Continuation of application No. PCT/CN2018/071817, filed on Jan. 8, 2018.

(51) Int. Cl.
| | | |
|---|---|---|
| *H04B 10/116* | (2013.01) | |
| *H04B 10/50* | (2013.01) | |
| *H04B 10/60* | (2013.01) | |

(52) U.S. Cl.
CPC ........ *H04B 10/116* (2013.01); *H04B 10/502* (2013.01); *H04B 10/503* (2013.01); *H04B 10/60* (2013.01)

(58) Field of Classification Search
CPC .. H04B 10/116; H04B 10/502; H04B 10/503; H04B 10/60
USPC .......................................................... 398/172
See application file for complete search history.

(56) References Cited

U.S. PATENT DOCUMENTS

| | | |
|---|---|---|
| 2011/0044404 A1 | 2/2011 | Vromans |
| 2017/0187455 A1 | 6/2017 | Roberts et al. |

(Continued)

FOREIGN PATENT DOCUMENTS

| | | |
|---|---|---|
| CN | 102164436 A | 8/2011 |
| CN | 103763829 A | 4/2014 |

(Continued)

OTHER PUBLICATIONS

Draft D1 IEEE Std 802.15.7r1-20xx, IEEE Standard for Local and metropolitan area networks-Part 15.7: Short-Rang Optical Wireless Communications, 2016. total 634 pages.

(Continued)

*Primary Examiner* — Dalzid E Singh
(74) *Attorney, Agent, or Firm* — Hauptman Ham, LLP

(57) ABSTRACT

A method includes receiving X pilot symbols, determining light source sequence numbers of the X light sources based on the X pilot symbols, receiving M×X undersampled pulse width modulation-based pulse position modulation (UPPM) symbols and parsing the M×X UPPM symbols thereby obtaining original data from a sending node by using N light sources. Each of the X pilot symbols includes W waveform segments. Each of the W waveform segments includes a first light source sequence number indication part that indicates a light source sequence number. Waveforms of waveform segments with odd sequence numbers in the W waveform segments are the same, waveforms of waveform segments with even sequence numbers in the W waveform segments are the same, and a duration of each of the W waveform segments is equal. The X pilot symbols are in a one-to-one correspondence with X light sources.

20 Claims, 17 Drawing Sheets

(56) References Cited

U.S. PATENT DOCUMENTS

| | | | |
|---|---|---|---|
| 2018/0035019 A1* | 2/2018 | Back | H04N 21/242 |
| 2018/0076892 A1* | 3/2018 | Brilman | H04B 10/116 |
| 2019/0223232 A1* | 7/2019 | Murakami | H04W 48/20 |
| 2020/0067623 A1* | 2/2020 | Murakami | H04B 10/25753 |

FOREIGN PATENT DOCUMENTS

| | | |
|---|---|---|
| CN | 105846896 A | 8/2016 |
| CN | 105865458 A | 8/2016 |
| CN | 107395987 A | 11/2017 |
| KR | 101550375 B1 | 9/2015 |
| WO | 2014180080 A1 | 11/2014 |
| WO | 2016133285 A1 | 8/2016 |

OTHER PUBLICATIONS

International Search Report issued in corresponding International Application No. PCT/CN2018/071817, dated Oct. 10, 2018, State Intellectual Property Office of the P.R. China, Beijing, China.
Zhang Min et al., Camera-based visible light communications. Science and Technology Review, 2016, vol. 34, No. 16, 8 pages.
Pengfei Luo et al., Undersampled-PAM with subcarrier modulation for camera communications. 2015 Opto-Electronics and Communications Conference (OECC), Dec. 3, 2015, 3 pages.
Chinese Office Action issued in corresponding Chinese Application No. 201880081678.3, dated Dec. 2, 2020, pp. 1-6.
Chinese Notice of Allowance issued in corresponding Chinese Application No. 201880081678.3, dated Apr. 20, 2021, pp. 1-4.

* cited by examiner

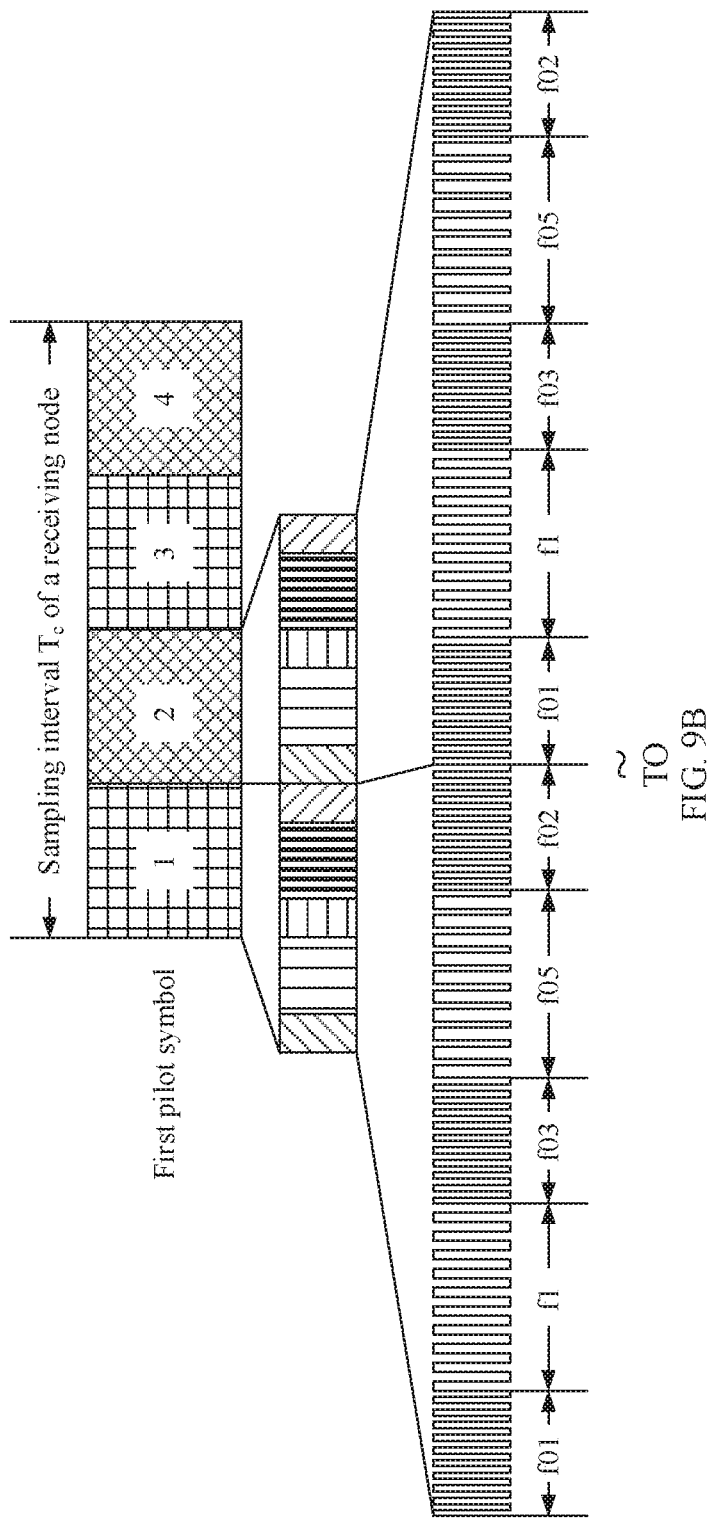

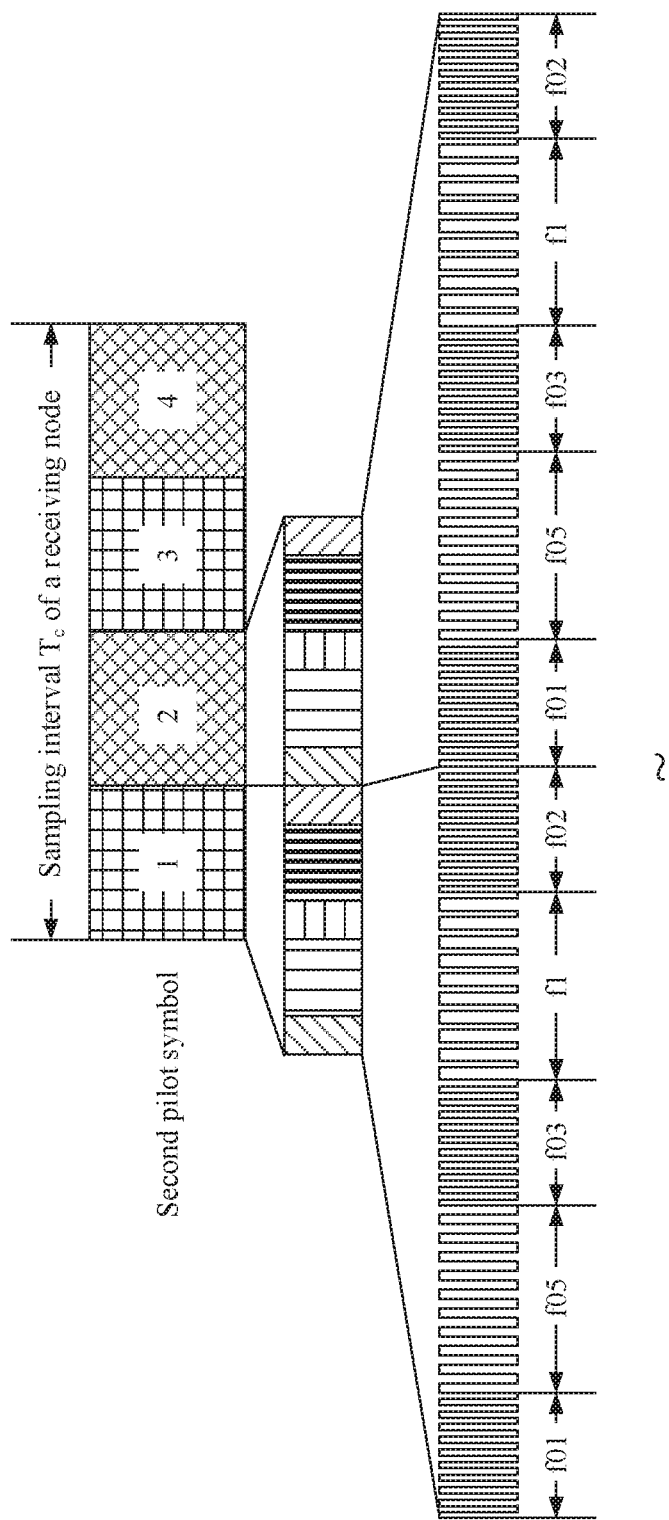

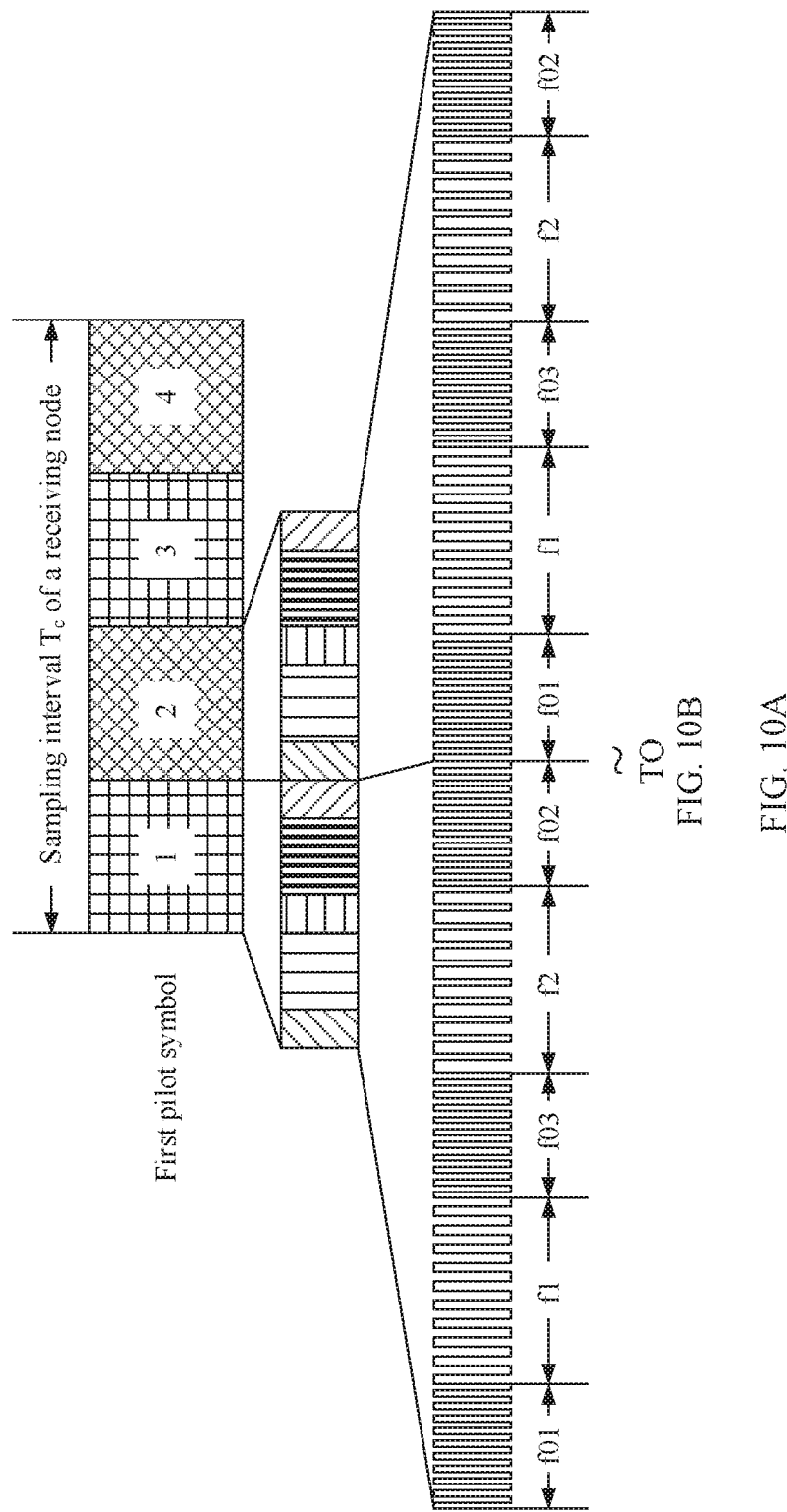

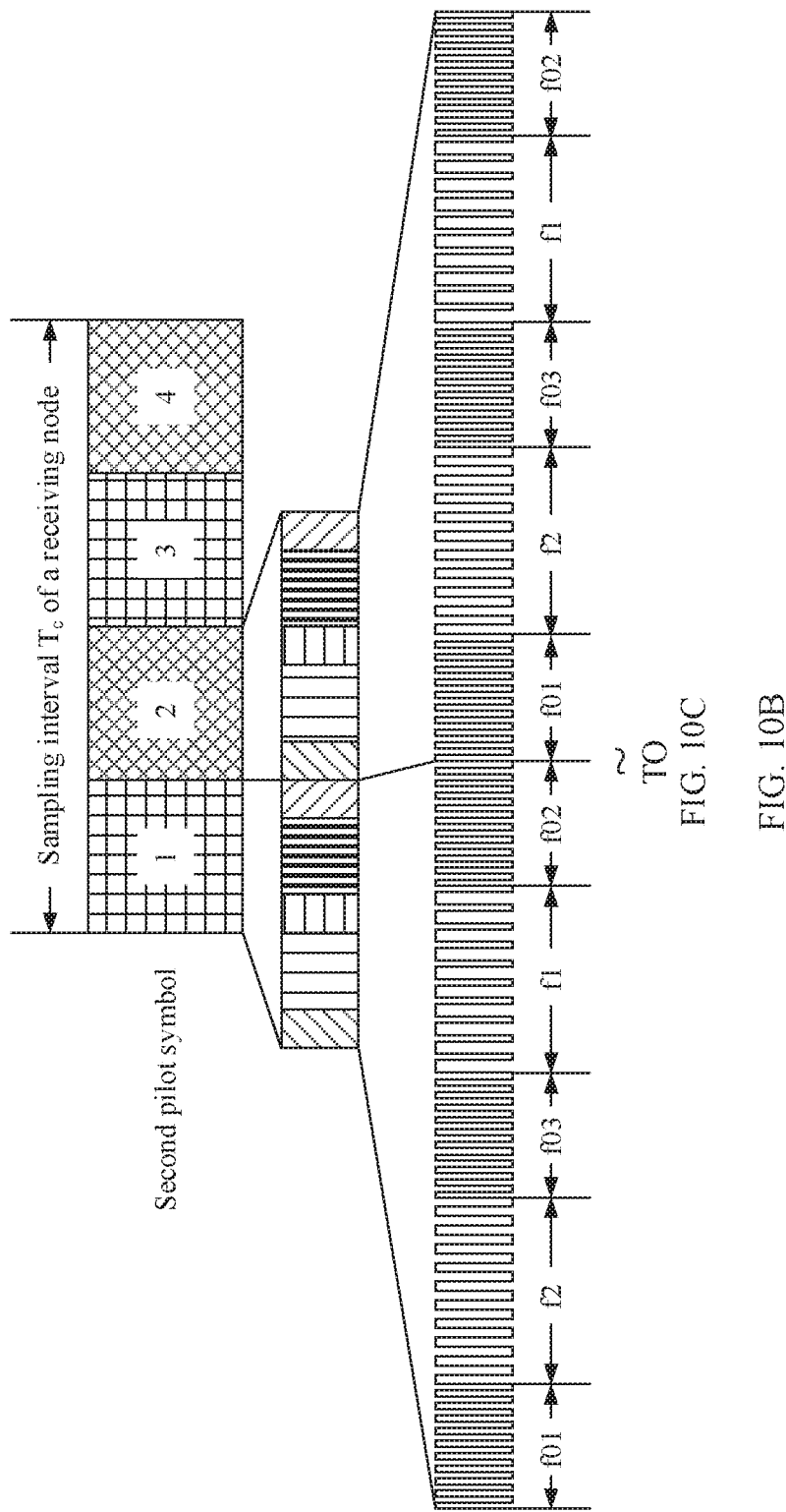

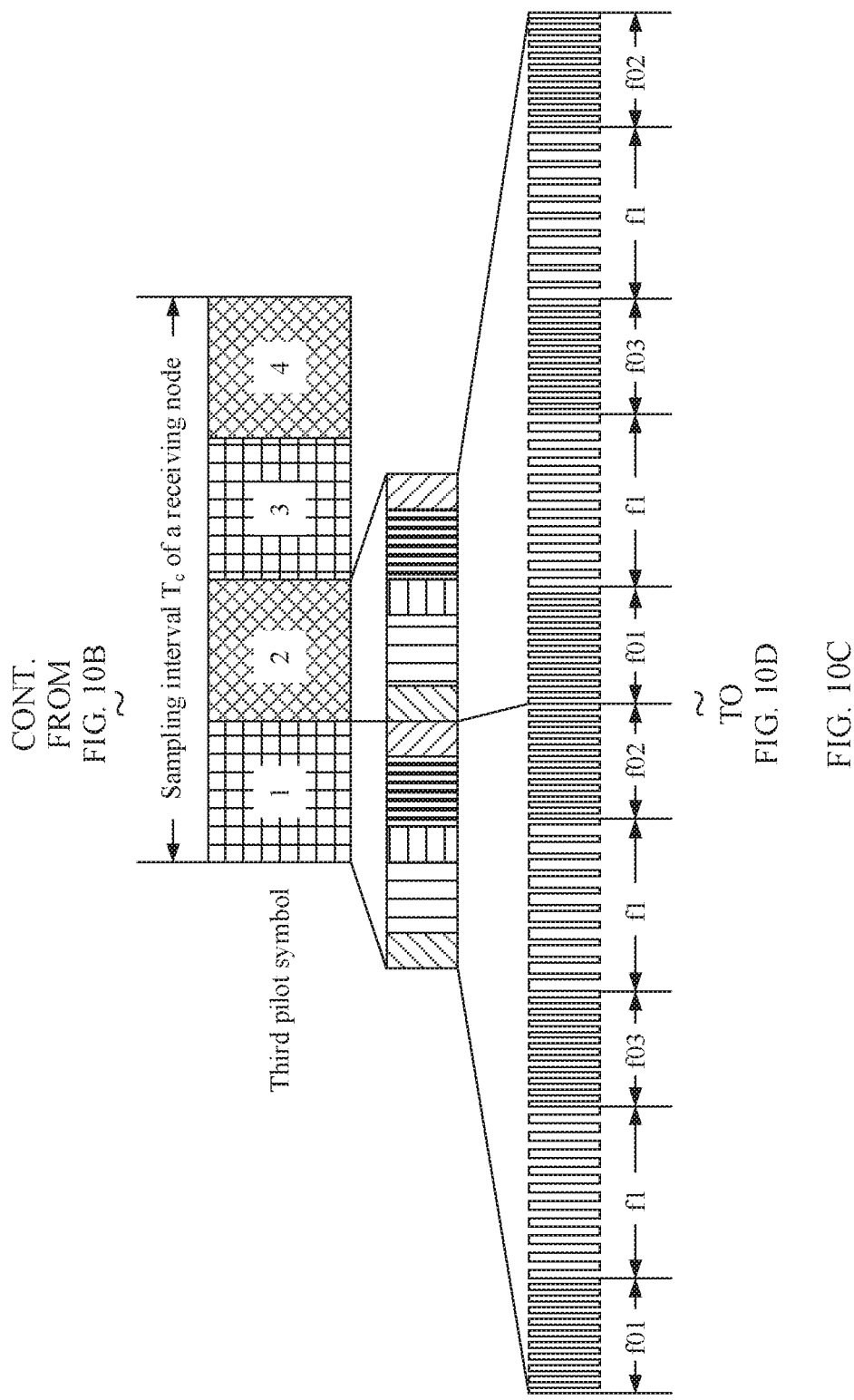

CAMERA COMMUNICATION METHOD AND APPARATUS

CROSS-REFERENCE TO RELATED APPLICATIONS

This application is a continuation of International Patent Application No. PCT/CN2018/071817, filed on Jan. 8, 2018, the disclosure of which is hereby incorporated by reference in its entirety.

TECHNICAL FIELD

Embodiments of this application relate to the communications field, and in particular, to a camera communication method and an apparatus.

BACKGROUND

With development of light-emitting diode (Light-emitting Diode, LED) technologies, LED lamps with high energy efficiency, a small size, and a long service life are widely applied to scenarios such as lighting, indication, and a screen. In addition, because an LED is characterized by a short response time, a signal can be sent through high-speed bright/dim blinking that cannot be observed by naked eyes, so that the LED can be potentially used as a signal transmitter in an optical communications system. Therefore, a visible light communications (Visible Light Communications, VLC) technology is becoming a subject attracting increasing attention in the lighting and communications industries.

Usually, for an LED optical signal, a photodiode (photodiode, PD) may be used as a photoelectric detector, and for a plurality of LED optical signals, an image sensor (Image Sensor, IS) including a PD array may be used as a photoelectric receiver. Currently, modules such as an LED light source and a camera are built in devices such as a mobile phone and a car. Although the light source and the camera are used only for lighting and video shooting, this lays a hardware foundation for actual application of an IS-based VLC system, and optical camera communications (Optical Camera Communications, OCC) between an LED light source and an optical camera can be implemented through simple reconstruction. Undersampled pulse width modulation (Undersampled Pulse Width Modulation, UPWM)-based pulse position modulation (UPWM-based Pulse Position Modulation, UPPM) is a camera communications technology that can implement zero blinking. Relatively high spectrum utilization can be achieved through reception by a rolling shutter. However, in an existing UPPM based OCC system, only camera communication with a single light source is specified, and no communication method is specified for a plurality of light sources. Therefore, in a scenario with a plurality of light sources, how to implement simultaneous transmission by using the plurality of light sources and improve transmission efficiency is a problem that urgently needs to be resolved.

SUMMARY

Embodiments of this application provide a camera communication method and an apparatus, to implement simultaneous transmission by using a plurality of light sources and improve transmission efficiency in a scenario with a plurality of light sources in an optical camera communications system.

To achieve the foregoing objective, the following technical solutions are used in the embodiments of this application.

According to a first aspect of the embodiments of this application, a camera communication method is provided. The method is applied to a sending node, the sending node includes N light sources, and the method includes: generating N pilot symbols and M×N UPPM symbols, where each of the N pilot symbols includes W waveform segments, each of the W waveform segments includes a first light source sequence number indication part, the first light source sequence number indication part is used to indicate a light source sequence number, waveforms of waveform segments with odd sequence numbers in the W waveform segments are the same, waveforms of waveform segments with even sequence numbers in the W waveform segments are the same, duration of each of the W waveform segments is equal, an average duty cycle of the waveform segments with the odd sequence numbers is a preset duty cycle and an average duty cycle of the waveform segments with the even sequence numbers is a complementary duty cycle of the preset duty cycle, or an average duty cycle of the waveform segments with the odd sequence numbers is a complementary duty cycle of a preset duty cycle and an average duty cycle of the waveform segments with the even sequence numbers is the preset duty cycle, the N pilot symbols are in a one-to-one correspondence with the N light sources, N is a positive integer greater than or equal to 2, $W=2k$, k is a positive integer greater than or equal to 1, and M is a positive integer greater than or equal to 1; and sending the N pilot symbols and the M×N UPPM symbols by using the N light sources, where one light source is used to send one pilot symbol and M UPPM symbols, and the M×N UPPM symbols include original data. According to the communication method provided in this embodiment of this application, the pilot symbols are added to a frame structure of a frame to be sent by the sending node, and the pilot symbols are used to indicate light source sequence numbers of the N light sources, so that a receiving node determines the light source sequence numbers based on the pilot symbols, receives the UPPM symbols, and further parses the received UPPM symbols to obtain the original data. This implements simultaneous transmission by using the N light sources and improves transmission efficiency.

It should be noted that a light source may be an LED or a laser diode (Laser Diode, LD). The preset duty cycle may be D %, and the complementary duty cycle of the preset duty cycle may be 1−D %, where D is greater than 0 and less than 100. If D % is not equal to 1−D %, for example, D % is 20%, and 1−D % is 80%, a waveform of a waveform segment with an odd sequence number is different from a waveform of a waveform segment with an even sequence number. If D % is equal to 1−D %, for example, 50%, a waveform of a waveform segment with an odd sequence number is the same as a waveform of a waveform segment with an even sequence number.

According to a second aspect of the embodiments of this application, a camera communication method is provided. The method is applied to a receiving node, and the method includes: receiving X pilot symbols, where each of the X pilot symbols includes W waveform segments, each of the W waveform segments includes a first light source sequence number indication part, the first light source sequence number indication part is used to indicate a light source sequence number, waveforms of waveform segments with odd sequence numbers in the W waveform segments are the same, waveforms of waveform segments with even sequence numbers in the W waveform segments are the same, duration of each of the W waveform segments is equal, an average duty cycle of the waveform segments with the odd sequence numbers is a preset duty cycle and an average duty cycle of the waveform segments with the even sequence numbers is a complementary duty cycle of the preset duty cycle, or an average duty cycle of the waveform segments with the odd sequence numbers is a complementary duty cycle of a preset duty cycle and an average duty cycle of the waveform segments with the even sequence numbers is the preset duty cycle, the X pilot symbols are in a one-to-one correspondence with X light sources, X is a positive integer greater than or equal to 1 and less than or equal to N, and W is a positive integer greater than or equal to 1; determining light source sequence numbers of the X light sources based on the X pilot symbols; receiving M×X UPPM symbols, where M is a positive integer greater than or equal to 1; and parsing the M×X UPPM symbols to obtain original data sent by a sending node by using N light sources. According to the communication method provided in this embodiment of this application, the pilot symbols are added to a frame structure of a frame to be sent by the sending node, and the pilot symbols are used to indicate light source sequence numbers of the N light sources, so that the receiving node determines the light source sequence numbers based on the pilot symbols, receives the UPPM symbols, and further parses the received UPPM symbols to obtain the original data. This implements simultaneous transmission by using the N light sources and improves transmission efficiency.

In this solution, the receiving X pilot symbols by the receiving node may be receiving only one waveform segment included in each of the X pilot symbols, or may be receiving only at least two waveform segments included in each of the X pilot symbols, or may be receiving any quantity of waveform segments included in each of the X pilot symbols. Certainly, the receiving node may alternatively receive an incomplete waveform segment, or the like. The receiving node can determine a light source sequence number of a light source provided that a complete waveform segment is received.

In addition, a waveform segment included in a pilot symbol received by the receiving node may start from a waveform segment, with an odd sequence number, included in a pilot symbol sent by the sending node, or may start from a waveform segment, with an even sequence number, included in a pilot symbol sent by the sending node. Therefore, a waveform segment, with an odd sequence number, included in a pilot symbol received by the receiving node may correspond to a waveform segment, with an odd sequence number, included in a pilot symbol sent by the sending node, or may correspond to a waveform segment, with an even sequence number, included in a pilot symbol sent by the sending node. If a waveform segment, with an odd sequence number, included in a pilot symbol received by the receiving node corresponds to a waveform segment, with an even sequence number, included in a pilot symbol sent by the sending node, an average duty cycle of waveform segments, with odd sequence numbers, included in the pilot symbol received by the receiving node is an average duty cycle of waveform segments, with even sequence numbers, included in the pilot symbol sent by the sending node.

With reference to the second aspect, in a possible implementation, the receiving X pilot symbols includes: performing progressive rolling shutter exposure on the sending node at an equal time interval, to obtain video information; obtaining a to-be-processed waveform based on the video information; and processing the to-be-processed waveform to obtain W waveform segments included in each of the X pilot symbols.

In the foregoing solution, regardless of whether the receiving node receives a signal at a short distance or a long distance, the receiving node needs to perform progressive rolling shutter exposure on the sending node at an equal time interval, so that a camera may be used to photograph a light source sequence that continuously transmits a UPPM signal and a pilot symbol.

Optionally, the obtaining a to-be-processed waveform based on the video information includes:

if the video information includes stripe information, performing mathematical processing on pixels of stripe information of each frame in the video information by row, to obtain the to-be-processed waveform.

In the foregoing solution, if the obtained video information includes the stripe information, the mathematical processing is performed on the pixels of the stripe information of each frame in the video information by row, to obtain the to-be-processed waveform. It should be noted that the mathematical processing may be summation processing or averaging processing. The receiving node may perform summation on stripe information of any frame in the video information by stripe row, to obtain the to-be-processed waveform.

According to a third aspect of the embodiments of this application, a sending node is provided. The sending node includes N light sources, and the sending node includes: a processing unit, configured to generate N pilot symbols and M×N UPPM symbols, where each of the N pilot symbols includes W waveform segments, each of the W waveform segments includes a first light source sequence number indication part, the first light source sequence number indication part is used to indicate a light source sequence number, waveforms of waveform segments with odd sequence numbers in the W waveform segments are the same, waveforms of waveform segments with even sequence numbers in the W waveform segments are the same, duration of each of the W waveform segments is equal, an average duty cycle of the waveform segments with the odd sequence numbers is a preset duty cycle and an average duty cycle of the waveform segments with the even sequence numbers is a complementary duty cycle of the preset duty cycle, or an average duty cycle of the waveform segments with the odd sequence numbers is a complementary duty cycle of a preset duty cycle and an average duty cycle of the waveform segments with the even sequence numbers is the preset duty cycle, the N pilot symbols are in a one-to-one correspondence with the N light sources, N is a positive integer greater than or equal to 2, $W=2k$, k is a positive integer greater than or equal to 1, and M is a positive integer greater than or equal to 1; and a sending unit, configured to send the N pilot symbols and the M×N UPPM symbols by using the N light sources, where one light source is used to send one pilot symbol and M UPPM symbols.

According to a fourth aspect of the embodiments of this application, a receiving node is provided, including: a receiving unit, configured to receive X pilot symbols, where each of the X pilot symbols includes W waveform segments, each of the W waveform segments includes a first light source sequence number indication part, the first light source sequence number indication part is used to indicate a light source sequence number, waveforms of waveform segments with odd sequence numbers in the W waveform segments are the same, waveforms of waveform segments with even sequence numbers in the W waveform segments are the same, duration of each of the W waveform segments is equal, an average duty cycle of the waveform segments with the odd sequence numbers is a preset duty cycle and an average duty cycle of the waveform segments with the even sequence numbers is a complementary duty cycle of the preset duty cycle, or an average duty cycle of the waveform segments with the odd sequence numbers is a complementary duty cycle of a preset duty cycle and an average duty cycle of the waveform segments with the even sequence numbers is the preset duty cycle, the X pilot symbols are in a one-to-one correspondence with X light sources, X is a positive integer greater than or equal to 1 and less than or equal to N, and W is a positive integer greater than or equal to 1; and a processing unit, configured to determine light source sequence numbers of the X light sources based on the X pilot symbols, where the receiving unit is further configured to receive M×X UPPM symbols, where M is a positive integer greater than or equal to 1; and the processing unit is further configured to parse the M×X UPPM symbols to obtain original data sent by a sending node by using N light sources.

With reference to the fourth aspect, in a possible implementation, the receiving unit is specifically configured to: perform progressive rolling shutter exposure on the sending node at an equal time interval, to obtain video information; obtain a to-be-processed waveform based on the video information; and process the to-be-processed waveform to obtain W waveform segments included in each of the X pilot symbols.

With reference to the foregoing possible implementation, in another possible implementation, each of the W waveform segments further includes a start delimiter and an end delimiter. The start delimiter is used to indicate a start of the waveform segment in which the start delimiter is located. The end delimiter is used to indicate an end of the waveform segment in which the end delimiter is located.

With reference to the foregoing possible implementations, in another possible implementation, an average duty cycle of start delimiters included in the waveform segments with the odd sequence numbers in the W waveform segments, an average duty cycle of first light source sequence number indication parts included in the waveform segments with the odd sequence numbers in the W waveform segments, and an average duty cycle of end delimiters included in the waveform segments with the odd sequence numbers in the W waveform segments are all the same as the preset duty cycle, and an average duty cycle of start delimiters included in the waveform segments with the even sequence numbers in the W waveform segments, an average duty cycle of first light source sequence number indication parts included in the waveform segments with the even sequence numbers in the W waveform segments, and an average duty cycle of end delimiters included in the waveform segments with the even sequence numbers in the W waveform segments are all the same as the complementary duty cycle of the preset duty cycle. Alternatively, an average duly cycle of start delimiters included in the waveform segments with the odd sequence numbers in the W waveform segments, an average duty cycle of first light source sequence number indication parts included in the waveform segments with the odd sequence numbers in the W waveform segments, and an average duty cycle of end delimiters included in the waveform segments with the odd sequence numbers in the W waveform segments are all the same as the complementary duty cycle of the preset duty cycle, and an average duty cycle of start delimiters included in the waveform segments with the even sequence numbers in the W waveform segments, an average duty cycle of first light source sequence number indication parts included in the waveform segments with the even sequence numbers in the W waveform segments, and an average duty cycle of end delimiters included in the waveform segments with the even sequence numbers in the W waveform segments are all the same as the preset duty cycle.

With reference to the foregoing possible implementations, in another possible implementation, the duration of each of the W waveform segments is $T_s$, and $T_s=T_{sd}+T_{h1}+T_{ed}=T_c/2$ k, where $T_{sd}$ represents duration of the start delimiter, $T_{h1}$ represents duration of the first light source sequence number indication part, $T_{h1}$ represents duration of the end delimiter, and $T_c$ represents a sampling interval of the receiving node. The start delimiter includes Q pulses, and a width of each of the Q pulses is less than a first threshold. The end delimiter includes P pulses, and a width of each of the P pulses is less than a second threshold. Q is an integer greater than or equal to 1. P is an integer greater than or equal to 1.

With reference to the foregoing possible implementations, in another possible implementation, frequencies of pulse width modulation waveforms included in all first light source sequence number indication parts in W waveform segments in one pilot symbol are the same, and frequencies of pulse width modulation waveforms included in first light source sequence number indication parts in different pilot symbols are different. The frequency of the pulse width modulation waveform included in the first light source sequence number indication part is any one of N frequencies. The N frequencies are different from each other. The frequency of the pulse width modulation waveform included in the first light source sequence number indication part is greater than 200 Hz and less than a preset frequency. A frequency of a pulse width modulation waveform included in the start delimiter is f01. A frequency of a pulse width modulation waveform included in the end delimiter is f02. f01 is greater than or equal to the preset frequency. f02 is greater than or equal to the preset frequency.

With reference to the foregoing possible implementations, in another possible implementation, a quantity of pulses included in the first light source sequence number indication part is used to indicate a light source sequence number, all first light source sequence number indication parts in W waveform segments in one pilot symbol include a same quantity of pulses, and first light source sequence number indication parts in different pilot symbols include different quantities of pulses.

With reference to the foregoing possible implementations, in another possible implementation, when N is greater than or equal to 3, each of the W waveform segments further includes a second light source sequence number indication part and a spacing delimiter. The first light source sequence number indication part and the second light source sequence number indication part are used to jointly indicate a light source sequence number. The spacing delimiter is used to separate the first light source sequence number indication part from the second light source sequence number indication part.

With reference to the foregoing possible implementations, in another possible implementation, an average duty cycle of second light source sequence number indication parts included in the waveform segments with the odd sequence numbers in the W waveform segments, and an average duty cycle of spacing delimiters included in the waveform segments with the odd sequence numbers in the W waveform segments are both the same as the preset duty cycle, and an average duty cycle of second light source sequence number indication parts included in the waveform segments with the even sequence numbers in the W waveform segments, and an average duty cycle of spacing delimiters included in the waveform segments with the even sequence numbers in the W waveform segments are both the same as the complementary duty cycle of the preset duty cycle. Alternatively, an average duty cycle of second light source sequence number indication parts included in the waveform segments with the odd sequence numbers in the W waveform segments, and an average duty cycle of spacing delimiters included in the waveform segments with the odd sequence numbers in the W waveform segments are both the same as the complementary duty cycle of the preset duty cycle, and an average duty cycle of second light source sequence number indication parts included in the waveform segments with the even sequence numbers in the W waveform segments, and an average duty cycle of spacing delimiters included in the waveform segments with the even sequence numbers in the W waveform segments are both the same as the preset duty cycle.

With reference to the foregoing possible implementations, in another possible implementation, the duration of each of the W waveform segments is $T_s$, and $T_s = T_{sd} T_{li2} + T_{id} + T_{li3} + T_{ed} = T_c 2k$, where $T_{sd}$ represents duration of the start delimiter, $T_{li2}$ represents duration of the first light source sequence number indication part, $T_{id}$ represents duration of the spacing delimiter, $T_{li3}$ represents duration of the second light source sequence number indication part, $T_{ed}$ represents duration of the end delimiter, and $T_c$ represents a sampling interval of the receiving node. The start delimiter includes A pulses, and a width of each of the A pulses is less than a first threshold. The end delimiter includes B pulses, and a width of each of the B pulses is less than a second threshold. The spacing delimiter includes C pulses, and a width of each of the C pulses is less than a third threshold. A is an integer greater than or equal to 1. B is an integer greater than or equal to 1. C is an integer greater than or equal to 0.

It should be noted that the duration $T_s$ of each of the W waveform segments is fixed duration. Therefore, $T_{li1}$ is greater than $T_{li2}$.

With reference to the foregoing possible implementations, in another possible implementation, different combinations of a frequency of a pulse width modulation waveform included in a first light source sequence number indication part and a frequency of a pulse width modulation waveform included in a second light source sequence number indication part are used to indicate a light source sequence number. In each of W waveform segments in one pilot symbol, frequencies of pulse width modulation waveforms included in first light source sequence number indication parts are the same, and frequencies of pulse width modulation waveforms included in second light source sequence number indication parts are the same. A frequency of a pulse width modulation waveform included in a first light source sequence number indication part included in each of W waveform segments in one pilot symbol is the same as or different from a frequency of a pulse width modulation waveform included in a second light source sequence number indication part included in the waveform segment. In different pilot symbols, combinations of a frequency of a pulse width modulation waveform included in a first light source sequence number indication part and a frequency of a pulse width modulation waveform included in a second light source sequence number indication part are different. The frequency of the pulse width modulation waveform included in the first light source sequence number indication part is any one of E frequencies. The frequency of the pulse width modulation waveform included in the second light source sequence number indication part is any one of R frequencies. The E frequencies are different from each other. The R frequencies are different from each other. The frequency of the pulse width modulation waveform included in the first light source sequence number indication part is greater than 200 Hz and less than a preset frequency. The frequency of the pulse width modulation waveform included in the second light source sequence number indication part is greater than 200 Hz and less than the preset frequency. A frequency of a pulse width modulation waveform included in the start delimiter is f01. A frequency of a pulse width modulation waveform included in the spacing delimiter is f03. A frequency of a pulse width modulation waveform included in the end delimiter is f02. f01 is greater than or equal to the preset frequency. f02 is greater than or equal to the preset frequency. f03 is greater than or equal to the preset frequency.

With reference to the foregoing possible implementations, in another possible implementation, every M UPPM symbols of the M×N UPPM symbols include a total light source quantity field, and the total light source quantity field is used to represent a quantity N of light sources used by the sending node to send the N pilot symbols and the M×N UPPM symbols.

With reference to the foregoing possible implementations, in another possible implementation, the parsing the M×X UPPM symbols to obtain original data sent by the sending node by using N light sources includes: parsing the M×X UPPM symbols to obtain a total quantity of light sources, where the total quantity of light sources represents the quantity N of light sources used by the sending node to send the N pilot symbols and the M×N UPPM symbols; determining whether X is equal to N; and if X is equal to N, obtaining, based on the M×X UPPM symbols, the original data sent by the sending node by using the N light sources.

With reference to the foregoing possible implementations, in another possible implementation, the processing unit is specifically configured to: parse the M×X UPPM symbols to obtain a total quantity of light sources, where the total light source quantity field is used to represent the quantity N of light sources used by the sending node to send the N pilot symbols and the M×N UPPM symbols; determine whether X is equal to N; and if X is equal to N, obtain, based on the M×X UPPM symbols, the original data sent by the sending node by using the N light sources.

With reference to the foregoing possible implementations, in another possible implementation, a frequency of a pulse width modulation waveform included in the first light source sequence number indication part is used to indicate a light source sequence number. Frequencies of pulse width modulation waveforms included in all first light source sequence number indication parts in W waveform segments in one pilot symbol are the same, and frequencies of pulse width modulation waveforms included in first light source sequence number indication parts in different pilot symbols are different. When N is equal to 2, frequencies of pulse width modulation waveforms included in all first light source sequence number indication parts in W waveform segments in one of the two pilot symbols are f1, frequencies of pulse width modulation waveforms included in all first light source sequence number indication parts in W waveform segments in the other one of the two pilot symbols are f04, a frequency of a pulse width modulation waveform included in a start delimiter in each of the two pilot symbols is f01, and a frequency of a pulse width modulation waveform included in an end delimiter in each of the two pilot symbols is f02, f01 is greater than or equal to a preset frequency, f02 is greater than or equal to the preset frequency, f1 is greater than 200 Hz and less than the preset frequency. f04 is greater than or equal to the preset frequency.

With reference to the foregoing possible implementations, in another possible implementation, when N is equal to 2, frequencies of pulse width modulation waveforms included in all first light source sequence number indication parts in W waveform segments in one of the two pilot symbols are f1, and frequencies of pulse width modulation waveforms included in all first light source sequence number indication parts in W waveform segments in the other one of the two pilot symbols are f2. f1 is greater than 200 Hz and less than the preset frequency. f2 is greater than 200 Hz and less than the preset frequency.

With reference to the foregoing possible implementations, in another possible implementation, when N is equal to 3, in each of the three pilot symbols, a frequency of a pulse width modulation waveform included in a start delimiter is f01, a frequency of a pulse width modulation waveform included in a spacing delimiter is f03, and a frequency of a pulse width modulation waveform included in an end delimiter is f02. f01 is greater than or equal to a preset frequency. f02 is greater than or equal to the preset frequency. f03 is greater than or equal to the preset frequency; in W waveform segments in a first pilot symbol of the three pilot symbols, frequencies of pulse width modulation waveforms included in all first light source sequence number indication parts are f1, and frequencies of pulse width modulation waveforms included in all second light source sequence number indication parts are f05; in W waveform segments in a second pilot symbol of the three pilot symbols, frequencies of pulse width modulation waveforms included in all first light source sequence number indication parts are f05, and frequencies of pulse width modulation waveforms included in all second light source sequence number indication parts are f1; and in W waveform segments in a third pilot symbol of the three pilot symbols, frequencies of pulse width modulation waveforms included in all first light source number indication parts are f1, and frequencies of pulse width modulation waveforms included in all second light source sequence number indication parts are f1. f1 is greater than 200 Hz and less than the preset frequency. f05 is greater than or equal to the preset frequency.

With reference to the foregoing possible implementations, in another possible implementation, when N is equal to 3, in each of the three pilot symbols, a frequency of a pulse width modulation waveform included in a start delimiter is f01, a frequency of a pulse width modulation waveform included in a spacing delimiter is f03, and a frequency of a pulse width modulation waveform included in an end delimiter is f02. f01 is greater than or equal to a preset frequency. f02 is greater than or equal to the preset frequency. f03 is greater than or equal to the preset frequency; in W waveform segments in a first pilot symbol of the three pilot symbols, frequencies of pulse width modulation waveforms included in all first light source sequence number indication parts are f1, and frequencies of pulse width modulation waveforms included in all second light source sequence number indication parts are f05; in W waveform segments in a second pilot symbol of the three pilot symbols, frequencies of pulse width modulation waveforms included in all first light source sequence number indication parts are f05, and frequencies of pulse width modulation waveforms included in all second light source sequence number indication parts are f1; and in W waveform segments in a third pilot symbol of the three pilot symbols, frequencies of pulse width modulation waveforms included in all first light source sequence number indication parts are f05, and frequencies of pulse width modulation waveforms included in all second light source sequence number indication parts are f05. f1 is greater than 200 Hz and less than the preset frequency. f05 is greater than or equal to the preset frequency.

With reference to the foregoing possible implementations, in another possible implementation, when N is equal to 3, in each of the three pilot symbols, a frequency of a pulse width modulation waveform included in a start delimiter is f01, a frequency of a pulse width modulation waveform included in a spacing delimiter is f03, and a frequency of a pulse width modulation waveform included in an end delimiter is f02. f01 is greater than or equal to a preset frequency. f02 is greater than or equal to the preset frequency. f03 is greater than or equal to the preset frequency; in W waveform segments in a first pilot symbol of the three pilot symbols, frequencies of pulse width modulation waveforms included in all first light source sequence number indication parts are f1, and frequencies of pulse width modulation waveforms included in all second light source sequence number indication parts are f1; in W waveform segments in a second pilot symbol of the three pilot symbols, frequencies of pulse width modulation waveforms included in all first light source sequence number indication parts are f1, and frequencies of pulse width modulation waveforms included in all second light source sequence number indication parts are f05; and in W waveform segments in a third pilot symbol of the three pilot symbols, frequencies of pulse width modulation waveforms included in all first light source sequence number indication parts are f05, and frequencies of pulse width modulation waveforms included in all second light source sequence number indication parts are f05. f1 is greater than 200 Hz and less than the preset frequency. f05 is greater than or equal to the preset frequency.

With reference to the foregoing possible implementations, in another possible implementation, when N is equal to 4, in W waveform segments in a first pilot symbol of the four pilot symbols, a frequency of a pulse width modulation waveform included in each first light source sequence number indication part is f1, and a frequency of a pulse width modulation waveform included in each second light source sequence number indication part is f2; in W waveform segments in a second pilot symbol of the four pilot symbols, a frequency of a pulse width modulation waveform included in each first light source sequence number indication part is f2, and a frequency of a pulse width modulation waveform included in each second light source sequence number indication part is f1; in W waveform segments in a third pilot symbol of the four pilot symbols, a frequency of a pulse width modulation waveform included in each first light source sequence number indication part is f1, and a frequency of a pulse width modulation waveform included in each second light source sequence number indication part is f1; and in W waveform segments in a fourth pilot symbol of the four pilot symbols, a frequency of a pulse width modulation waveform included in each first light source sequence number indication part is f2, and a frequency of a pulse width modulation waveform included in each second light source sequence number indication part is f2. f1 is greater than 200 Hz and less than the preset frequency. f2 is greater than 200 Hz and less than the preset frequency.

With reference to the foregoing possible implementations, in another possible implementation, duration of each of the N pilot symbols is a sampling interval of the receiving node.

It should be noted that the functional modules in the third aspect and the fourth aspect may be implemented by hardware, or may be implemented by hardware executing corresponding software. The hardware or software includes one or more modules corresponding to the foregoing functions. For example, a transceiver is configured to complete functions of the receiving unit and the sending unit, a processor is configured to complete functions of the processing unit, and a memory is configured to process a program instruction of the communication method in the embodiments of this application. The processor, the transceiver, and the memory are connected and communicate with each other by using a bus. For details, refer to the functions of the behavior of the sending node in the communication method provided in the first aspect, and the functions of the behavior of the receiving node in the communication method provided in the second aspect.

A fifth aspect of the embodiments of this application provides a sending node. The sending node includes a processor, a memory, a bus, and a communications interface. The memory is configured to store a computer executable instruction. The processor and the memory are connected by using the bus. When the processor runs, the processor executes the computer executable instruction stored in the memory, so that the sending node performs the method according to any one of the foregoing aspects.

A sixth aspect of the embodiments of this application provides a receiving node. The receiving node includes a processor, a memory, a bus, and a communications interface. The memory is configured to store a computer executable instruction. The processor and the memory are connected by using the bus. When the processor runs, the processor executes the computer executable instruction stored in the memory, so that the receiving node performs the method according to any one of the foregoing aspects.

According to a seventh aspect of the embodiments of this application, a computer-readable storage medium is provided, including a computer software instruction. When the computer software instruction runs on a sending node or a built-in chip of a sending node, the sending node is enabled to perform the foregoing communication method.

According to an eighth aspect of the embodiments of this application, a computer-readable storage medium is provided, including a computer software instruction. When the computer software instruction runs on a receiving node or a built-in chip of a receiving node, the receiving node is enabled to perform the foregoing communication method.

According to a ninth aspect of the embodiments of this application, a computer program product including an instruction is provided. When the computer program product runs on a sending node or a built-in chip of a sending node, the sending node is enabled to perform the foregoing communication method.

According to a tenth aspect of the embodiments of this application, a computer program product including an instruction is provided. When the computer program product runs on a receiving node or a built-in chip of a receiving node, the receiving node is enabled to perform the foregoing communication method.

In addition, for technical effects brought by the design manners of any one of the foregoing aspects, refer to technical effects brought by different design manners of the first aspect and the second aspect. Details, and details are not described herein again.

In the embodiments of this application, names of the sending node and the receiving node constitute no limitation on the devices. During actual implementation, these devices may have other names, provided that functions of each device are similar to those in the embodiments of this application and fall within the scope of the claims of this application and their equivalent technologies.

BRIEF DESCRIPTION OF DRAWINGS

FIG. 9A, FIG. 9B, and FIG. 9C are a schematic structural diagram of yet another pilot symbol according to an embodiment of this application;

FIG. 10A, FIG. 10B, FIG. 10C, and FIG. 10D are a schematic structural diagram of yet another pilot symbol according to an embodiment of this application;

DESCRIPTION OF EMBODIMENTS

A camera communication method provided in embodiments of this application may be applied to a plurality of communications systems, for example, an optical camera communications (Optical Camera Communications, OCC) system.

Figure 1:
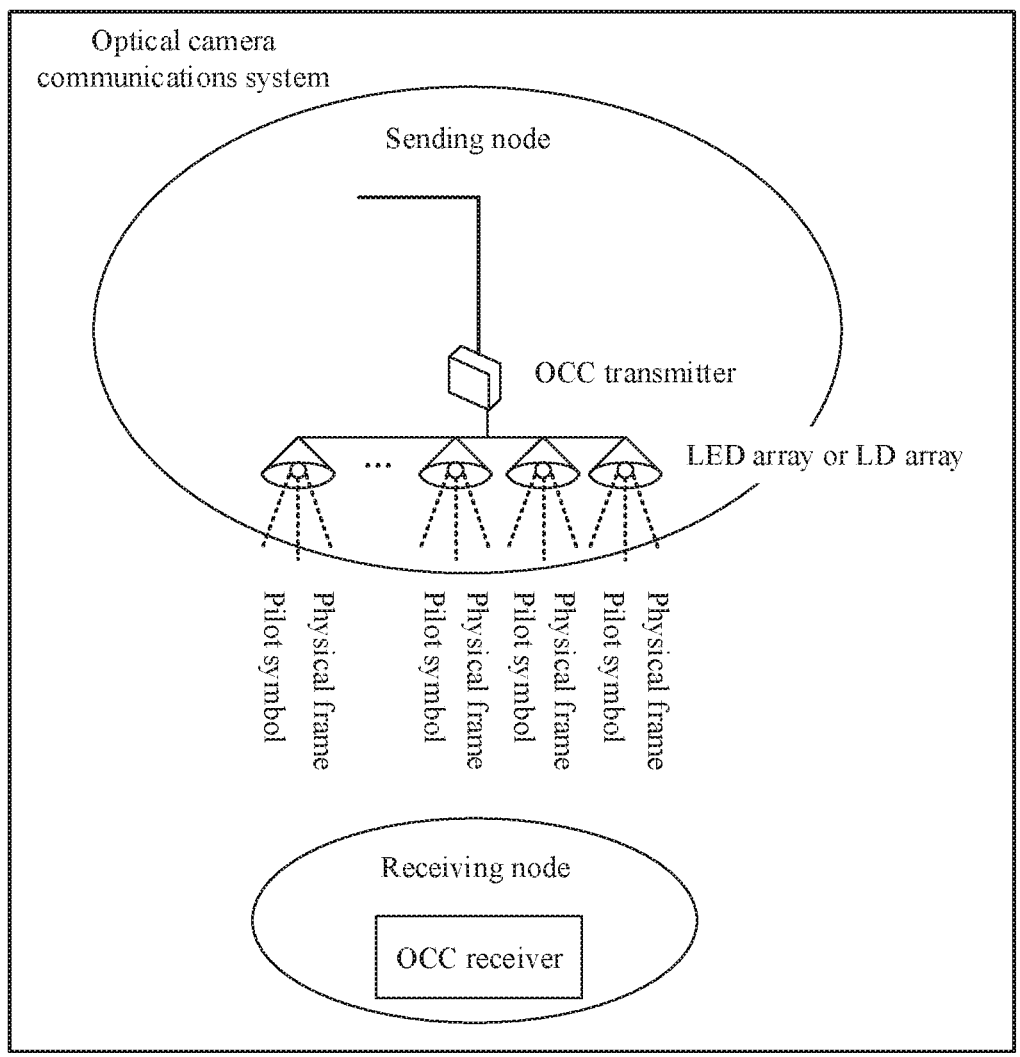
FIG. 1 is a schematic architectural diagram of an optical camera communications system according to an embodiment of this application.

For example, FIG. 1 is a schematic architectural diagram of an optical camera communications system according to an embodiment of this application. The system includes a sending node and a receiving node. The sending node includes at least an OCC transmitter. The OCC transmitter is equipped with an LED array or an LD array, and may be a lighting lamp, a front/rear light of a car, a traffic signal light, or the like that has an OCC function. The receiving node includes at least an OCC receiver. For example, the OCC receiver may be a smartphone, a tablet computer, a surveillance camera, an event data recorder, or the like that has a built-in camera with an OCC function. It should be noted that the built-in camera in this embodiment of this application obtains a photographed image through rolling shutter (Rolling Shutter, RS) exposure.

A communication method provided in an embodiment of this application is applied to a sending node and a receiving node. The sending node includes N light sources. The method includes: generating, by the sending node, N pilot symbols and M×N UPPM symbols, where each of the N pilot symbols includes W waveform segments, each of the W waveform segments includes a first light source sequence number indication part, the first light source sequence number indication part is used to indicate a light source sequence number, waveforms of waveform segments odd sequence numbers in the W waveform segments are the same, waveforms of waveform segments with even sequence numbers in the W waveform segments are the same, duration of each of the W waveform segments is equal, an average duty cycle of the waveform segments with the odd sequence numbers is a preset duty cycle and an average duty cycle of the waveform segments with the even sequence numbers is a complementary duty cycle of the preset duty cycle, or an average duty cycle of the waveform segments with the odd sequence numbers is a complementary duty cycle of a preset duty cycle and an average duty cycle of the waveform segments with the even sequence numbers is the preset duty cycle, the N pilot symbols are in a one-to-one correspondence with the N light sources, N is a positive integer greater than or equal to 2, k is a positive integer greater than or equal to 1, and M is a positive integer greater than or equal to 1; sending the N pilot symbols and the M×N UPPM symbols by using the N light sources, where one light source is used to send one pilot symbol and M UPPM symbols; receiving, by the receiving node, X pilot symbols, where each of the X pilot symbols includes W waveform segments; determining light source sequence numbers of the X light sources based on the X pilot symbols; receiving M×X UPPM symbols, where M is a positive integer greater than or equal to 1; and parsing the M×X UPPM symbols to obtain original data sent by the sending node by using the N light sources, where for the sending node, W=2 k, and for the receiving node, W is a positive integer greater than or equal to 1. According to the camera communication method provided in this embodiment of this application, the pilot symbols are added to a frame structure of a frame to be sent by the sending node, and the pilot symbols are used to indicate light source sequence numbers of the N light sources, so that the receiving node receives the UPPM symbols based on the pilot symbols, and further parses the received UPPM symbols to obtain the original data. This implements simultaneous transmission of the UPPM symbols by using the N light sources, and improves transmission efficiency.

The following describes the implementations of the embodiments of this application in detail with reference to the accompanying drawings.

Figure 2:
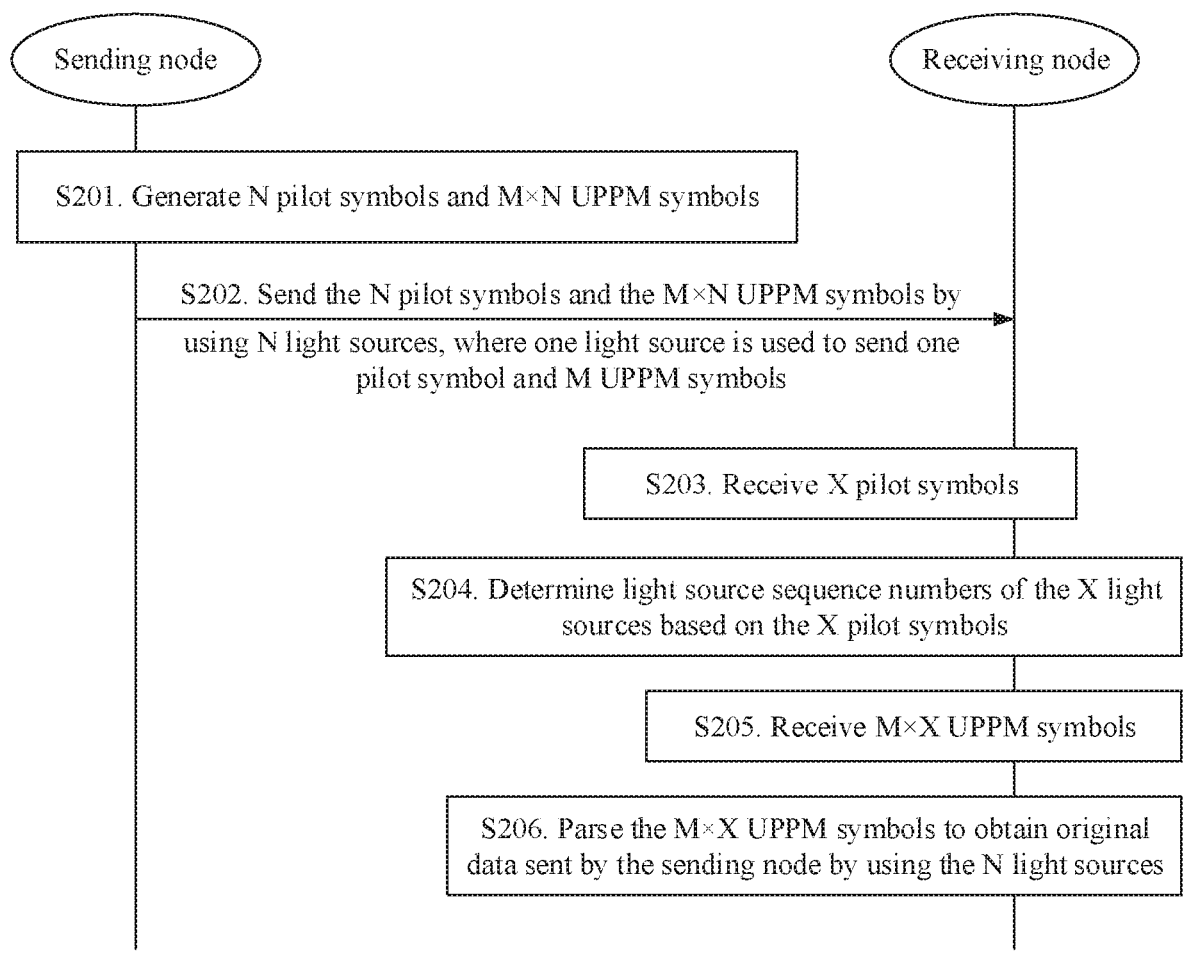
FIG. 2 is a flowchart of a camera communication method according to an embodiment of this application.

FIG. 2 is a flowchart of a camera communication method according to an embodiment of this application. A sending node includes N light sources. As shown in FIG. 2, the method may include the following steps.

S201. The sending node generates N pilot symbols and M×N UPPM symbols.

In the prior art, when a sending node in an optical camera communications system includes one LED or one LD, the sending node may directly send valid data to a receiving node.

For a scenario in which a sending node in an optical camera communications system includes an LED array or an LD array and UPPM symbols are sent in parallel by using N light sources, that is, a scenario with a plurality of light sources, in this embodiment of this application, the sending node may first send a pilot symbol for each light source, where it is ensured that a unique pilot symbol is sent for each light source; and then send UPPM symbols. A receiving node may determine, based on the pilot symbol, a light source from which a received signal comes, so that the UPPM symbols received after the pilot symbol can be correctly combined into a valid frame. The following describes in detail a structure of the pilot symbol in this embodiment of this application and how to indicate a light source by using the pilot symbol.

Figure 3:
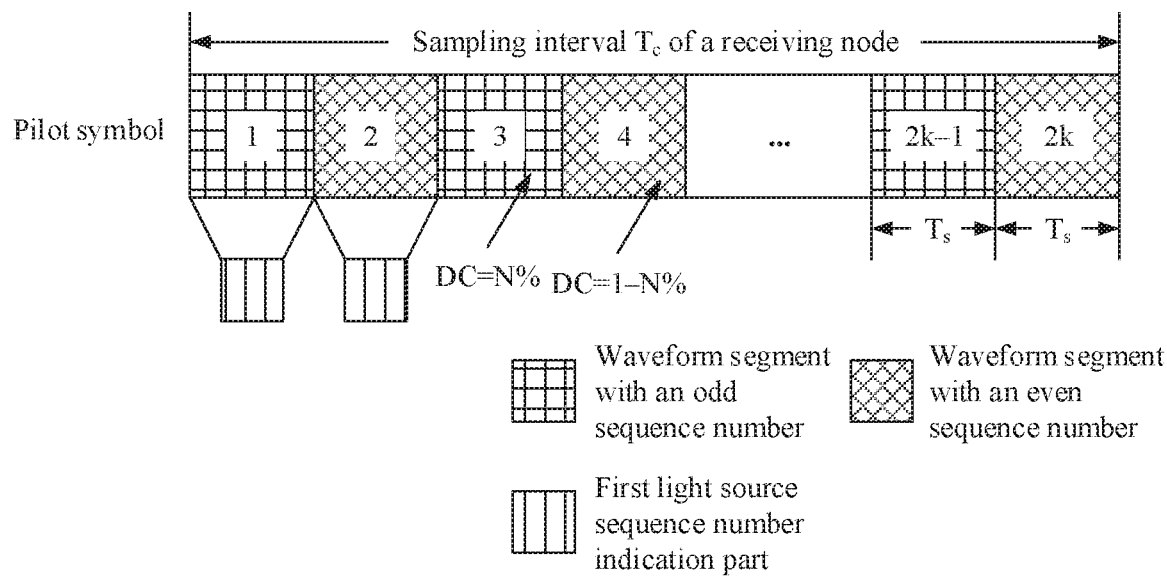
FIG. 3 is a schematic structural diagram of a pilot symbol according to an embodiment of this application.

When N is greater than or equal to 2, each of the N pilot symbols includes W waveform segments. In this case, W=2 k, each of the W waveform segments includes a first light source sequence number indication part, the first light source sequence number indication part is used to indicate a light source sequence number, and the light source sequence number indicates a sequence number of a light source used to send a current UPPM symbol. FIG. 3 is a schematic structural diagram of a pilot symbol according to an embodiment of this application. Waveforms of waveform segments with odd sequence numbers in the W waveform segments are the same, and waveforms of waveform segments with even sequence numbers in the W waveform segments are the same. Duration of each of the N pilot symbols is a sampling interval of the receiving node. Duration of each of the W waveform segments is equal. An average duty cycle (Duty Cycle, DC) of the waveform segments with the odd sequence numbers is a preset duty cycle, and an average duty cycle of the waveform segments with the even sequence numbers is a complementary duty cycle of the preset duty cycle. The N pilot symbols are in a one-to-one correspondence with the N light sources, and k is a positive integer greater than or equal to 1.

Figure 4:
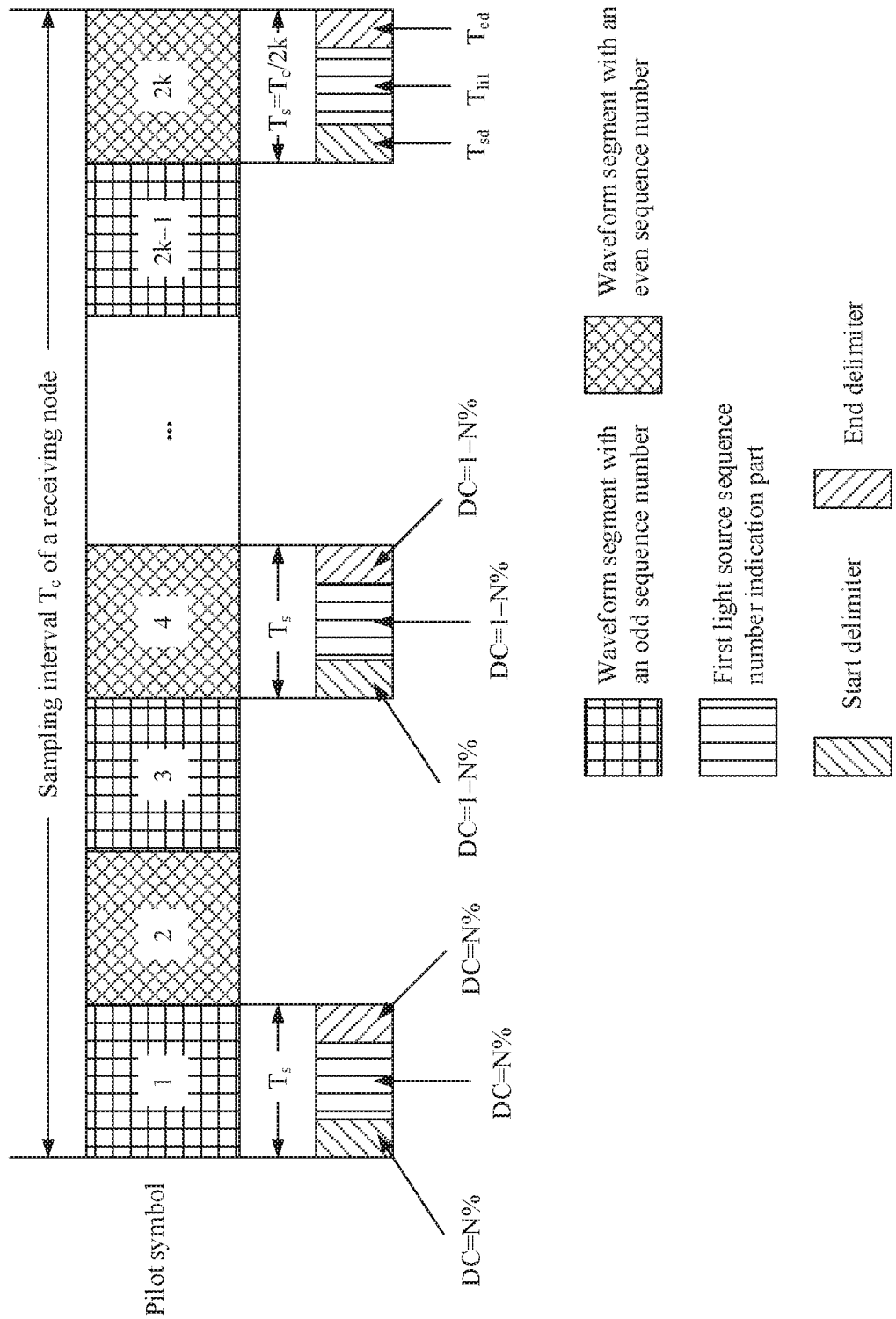
FIG. 4 is a schematic structural diagram of another pilot symbol according to an embodiment of this application.

To distinguish between the W waveform segments included in the pilot symbol, each of the W waveform segments further includes a start delimiter and an end delimiter. The start delimiter is used to indicate a start of the waveform segment in which the start delimiter is located, and the end delimiter is used to indicate an end of the waveform segment in which the end delimiter is located. FIG. 4 is a schematic structural diagram of another pilot symbol according to an embodiment of this application.

It should be noted that an average duty cycle of start delimiters included in the waveform segments with the odd sequence numbers in the W waveform segments, an average duty cycle of first light source sequence number indication parts included in the waveform segments with the odd sequence numbers in the W waveform segments, and an average duty cycle of end delimiters included in the waveform segments with the odd sequence numbers in the W waveform segments are all the same as the preset duty cycle, and an average duty cycle of start delimiters included in the waveform segments with the even sequence numbers in the W waveform segments, an average duty cycle of first light source sequence number indication parts included in the waveform segments with the even sequence numbers in the W waveform segments, and an average duty cycle of end delimiters included in the waveform segments with the even sequence numbers in the W waveform segments are all the same as the complementary duty cycle of the preset duty cycle.

Optionally, an average duty cycle of the waveform segments with the odd sequence numbers is a complementary duty cycle of a preset duty cycle, and an average duty cycle of the waveform segments with the even sequence numbers is the preset duty cycle. An average duty cycle of start delimiters included in the waveform segments with the odd sequence numbers in the W waveform segments, an average duty cycle of first light source sequence number indication parts included in the waveform segments with the odd sequence numbers in the W waveform segments, and an average duty cycle of end delimiters included in the waveform segments with the odd sequence numbers in the W waveform segments are all the same as the complementary duty cycle of the preset duty cycle, and an average duty cycle of start delimiters included in the waveform segments with the even sequence numbers in the W waveform segments, an average duty cycle of first light source sequence number indication parts included in the waveform segments with the even sequence numbers in the W waveform segments, and an average duty cycle of end delimiters included in the waveform segments with the even sequence numbers in the W waveform segments are all the same as the preset duty cycle.

The duration of each of the W waveform segments is $T_s$, and $T_s = T_{sd} + T_{li1} + T_{ed} = T_c / 2$ k, Where $T_{sd}$ represents duration of the start delimiter, $T_{li1}$ represents duration of the first light source sequence number indication part, $T_{ed}$ represents duration of the end delimiter, and $T_c$ represents a sampling interval of the receiving node. The start delimiter includes Q pulses, and a width of each of the Q pulses is less than a first threshold. The end delimiter includes P pulses, and a width of each of the P pulses is less than a second threshold. Q is an integer greater than or equal to 1. P is an integer greater than or equal to 1.

Figure 5:
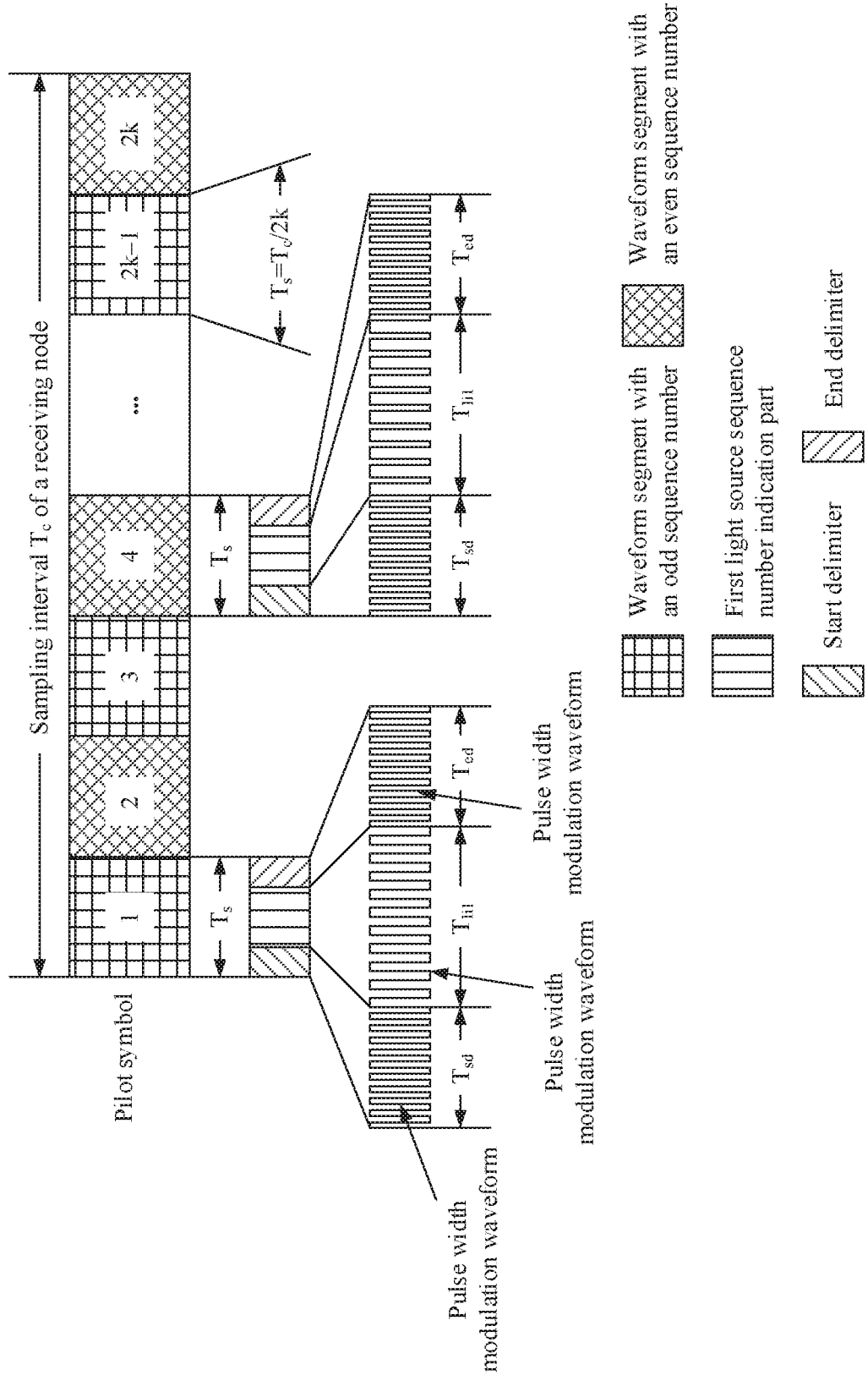
FIG. 5 is a schematic structural diagram of still another pilot symbol according to an embodiment of this application.

As shown in FIG. 5, the start delimiter and the end delimiter of each of the W waveform segments each are implemented by using a pulse width modulation (Pulse Width Modulation, PWM) waveform, and the first light source sequence number indication part of each of the W waveform segments is implemented by using a PWM waveform.

In a first possible implementation, when N is greater than or equal to 2, a frequency of a pulse width modulation waveform included in the first light source sequence number indication part may be set, and the receiving node distinguishes between light sources by using the frequency of the pulse width modulation waveform included in the first light source sequence number indication part. Frequencies of pulse width modulation waveforms included in all first light source sequence number indication parts in W waveform segments in one pilot symbol are the same, and frequencies of pulse width modulation waveforms included in first light source sequence number indication parts in different pilot symbols are different. The frequency of the pulse width modulation waveform included in the first light source sequence number indication part is any one of N frequencies. The N frequencies are different from each other. The frequency of the pulse width modulation waveform included in the first light source sequence number indication part is greater than 200 Hz and less than a preset frequency. A frequency of a pulse width modulation waveform included in the start delimiter is f01. A frequency of a pulse width modulation waveform included in the end delimiter is f02. f01 is greater than or equal to the preset frequency. f02 is greater than or equal to the preset frequency.

For example, a frequency of a pulse width modulation waveform included in a first light source sequence number indication part in a pilot symbol sent by using a first light source is f1, a frequency of a pulse width modulation waveform included in a first light source sequence number indication part in a pilot symbol sent by using a second light source is f2, a frequency of a pulse width modulation waveform included in a first light source sequence number indication part in a pilot symbol sent by using a third light source is f3, and by analogy, a frequency of a pulse width modulation waveform included in a first light source sequence number indication part in a pilot symbol sent by using an $N^{th}$ light source is fN.

In a second possible implementation, when N is greater than or equal to 2, a quantity of pulses included in the first light source sequence number indication part may be set, and the receiving node distinguishes between light sources by using the quantity of pulses included in the first light source sequence number indication part. All first light source sequence number indication parts in W waveform segments in one pilot symbol include a same quantity of pulses, and first light source sequence number indication parts in different pilot symbols include different quantities of pulses.

For example, a first light source sequence number indication part in a pilot symbol sent by using a first light source includes one pulse, a first light source sequence number indication part in a pilot symbol sent by using a second light source includes two pulses, a first light source sequence number indication part in a pilot symbol sent by using a third light source includes three pulses, and by analogy, a first light source sequence number indication part in a pilot symbol sent by using an $N^{th}$ light source includes N pulses.

To reduce system complexity, a plurality of frequency combinations may be set based on the foregoing structure of the pilot symbol, and the receiving node distinguishes between light sources by using a combination of frequencies of pulse width modulation waveforms, thereby reducing a quantity of transmit frequencies.

Figure 6:
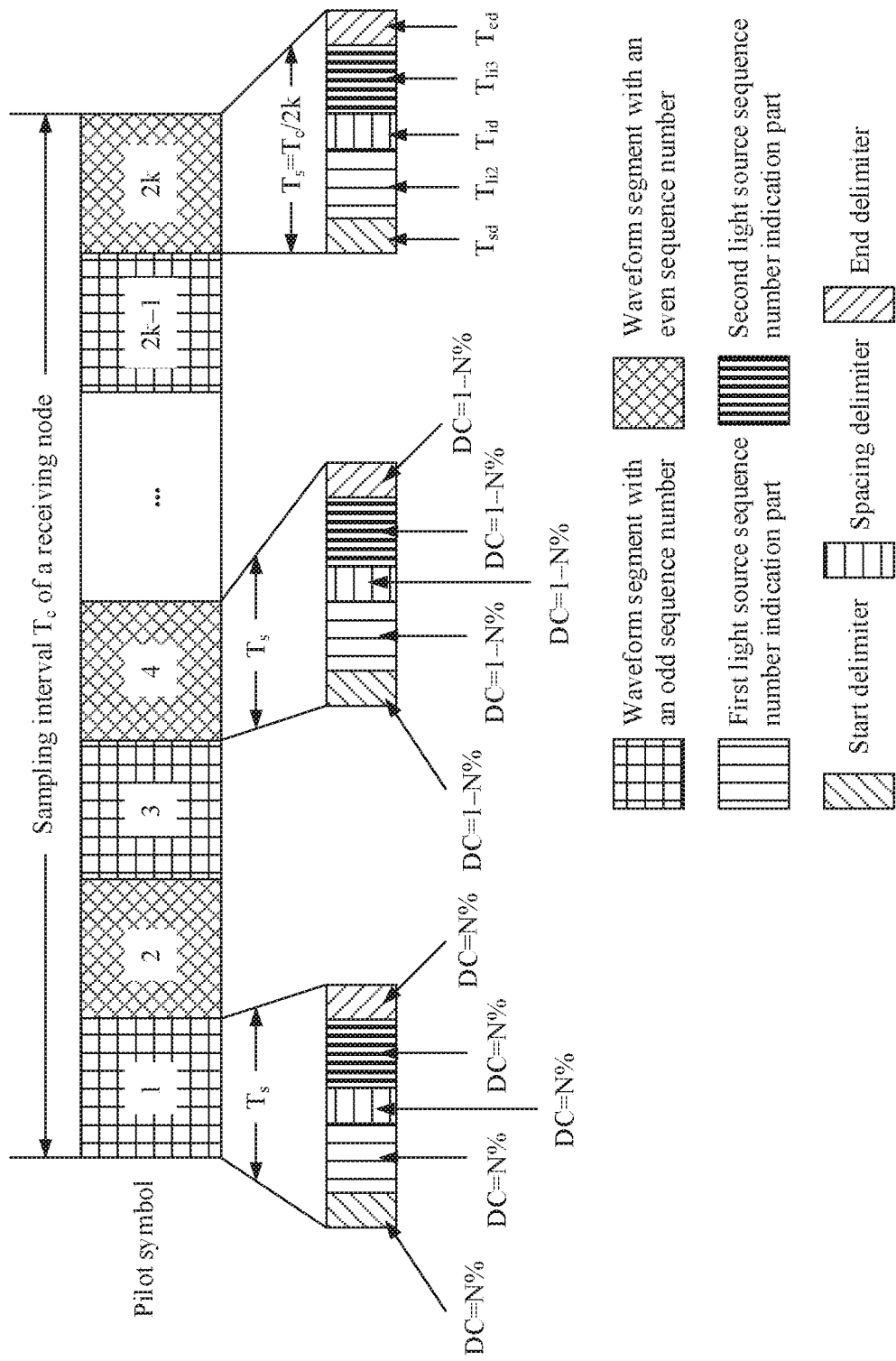
FIG. 6 is a schematic structural diagram of yet another pilot symbol according to an embodiment of this application.

When N is greater than or equal to 3, each of the W waveform segments further includes a second light source sequence number indication part and a spacing delimiter. FIG. 6 is a schematic structural diagram of yet another pilot symbol according to an embodiment of this application. The first light source sequence number indication part and the second light source sequence number indication part are used to jointly indicate a light source sequence number. The spacing delimiter is used to separate the first light source sequence number indication part from the second light source sequence number indication part.

It should be noted that an average duty cycle of second light source sequence number indication parts included in the waveform segments with the odd sequence numbers in the W waveform segments, and an average duty cycle of spacing delimiters included in the waveform segments with the odd sequence numbers in the W waveform segments are both the same as the preset duty cycle, and an average duty cycle of second light source sequence number indication parts included in the waveform segments with the even sequence numbers in the W waveform segments, and an average duty cycle of spacing delimiters included in the waveform segments with the even sequence numbers in the W waveform segments are both the same as the complementary duty cycle of the preset duty cycle.

Optionally, an average duty cycle of second light source sequence number indication parts included in the waveform segments with the odd sequence numbers in the W waveform segments, and an average duty cycle of spacing delimiters included in the waveform segments with the odd sequence numbers in the W waveform segments are both the same as the complementary duty cycle of the preset duty cycle, and an average duty cycle of second light source sequence number indication parts included in the waveform segments with the even sequence numbers in the W waveform segments, and an average duty cycle of spacing delimiters included in the waveform segments with the even sequence numbers in the W waveform segments are both the same as the preset duty cycle.

The duration of each of the W waveform segments is $T_s$, and $T_s = T_{sd} + T_{h2} + T_{id} + T_{h3} + T_{ed} = T_c/2$ k, where $T_{sd}$ represents duration of the start delimiter, $T_{h2}$ represents duration of the first light source sequence number indication part, $T_{id}$ represents duration of the spacing delimiter, $T_{h3}$ represents duration of the second light source sequence number indication part, $T_{ed}$ represents duration of the end delimiter, and $T_c$ represents a sampling interval of the receiving node. The start delimiter includes A pulses, and a width of each of the A pulses is less than a first threshold. The end delimiter includes B pulses, and a width of each of the B pulses is less than a second threshold. The spacing delimiter includes C pulses, and a width of each of the C pulses is less than a third threshold. A is an integer greater than or equal to 1. B is an integer greater than or equal to 1. C is an integer greater than or equal to 0.

In a third possible implementation, when N is greater than or equal to 3, different combinations of a frequency of a pulse width modulation waveform included in a first light source sequence number indication part and a frequency of a pulse width modulation waveform included in a second light source sequence number indication part are used to indicate a light source sequence number. Frequencies of pulse width modulation waveforms included in first light source sequence number indication parts in each of W waveform segments in one pilot symbol are the same. Frequencies of pulse width modulation waveforms included in second light source sequence number indication parts in each of W waveform segments in one pilot symbol are the same. A frequency of a pulse width modulation waveform included in a first light source sequence number indication part included in each of W waveform segments in one pilot symbol is the same as or different from a frequency of a pulse width modulation waveform included in a second light source sequence number indication part included in the waveform segment. In different pilot symbols, combinations of a frequency of a pulse width modulation waveform included in a first light source sequence number indication part and a frequency of a pulse width modulation waveform included in a second light source sequence number indication part are different. The frequency of the pulse width modulation waveform included in the first light source sequence number indication part is any one of E frequencies. The frequency of the pulse width modulation waveform included in the second light source sequence number indication part is any one of R frequencies. The E frequencies are different from each other. The R frequencies are different from each other. The frequency of the pulse width modulation waveform included in the first light source sequence number indication part is greater than 200 Hz and less than a preset frequency. The frequency of the pulse width modulation waveform included in the second light source sequence number indication part is greater than 200 Hz and less than the preset frequency. A frequency of a pulse width modulation waveform included in the start delimiter is f01. A frequency of a pulse width modulation waveform included in the spacing delimiter is f03. A frequency of a pulse width modulation waveform included in the end delimiter is f02. f01 is greater than or equal to the preset frequency. f02 is greater than or equal to the preset frequency, f03 is greater than or equal to the preset frequency.

For example, when the sending node includes four light sources, two frequencies may be set. There are four combinations of the two frequencies. The four combinations of the two frequencies may be used to indicate the four light sources. Different combinations of a frequency of a pulse width modulation waveform included in a first light source sequence number indication part and a frequency of a pulse width modulation waveform included in a second light source sequence number indication part are shown in Table 1.

TABLE 1

| Light source sequence number | Light source 1 | Light source 2 | Light source 3 | Light source 4 |
|---|---|---|---|---|
| Frequency combination | f1/f2 | f2/f1 | f1/f1 | f2/f2 |

When the sending node includes five light sources, three frequencies may be set. There are nine combinations of the three frequencies. Any five combinations may be selected from the nine combinations of the three frequencies to indicate the five light sources. Different combinations of a frequency of a pulse width modulation waveform included in a first light source sequence number indication part and a frequency of a pulse width modulation waveform included in a second light source sequence number indication part are shown in Table 2.

TABLE 2

| Light source sequence number | Light source 1 | Light source 2 | Light source 3 | Light source 4 | Light source 5 |
|---|---|---|---|---|---|
| Frequency combination | f1/f2 | f2/f1 | f1/f1 | f2/f2 | f1/f3 |

When the sending node includes six light sources, three frequencies may be set. There are nine combinations of the three frequencies. Any six combinations may be selected from the nine combinations of the three frequencies to indicate the six light sources. Different combinations of a frequency of a pulse width modulation waveform included in a first light source sequence number indication part and a frequency of a pulse width modulation waveform included in a second light source sequence number indication part are shown in Table 3.

TABLE 3

| Light source sequence number | Light source 1 | Light source 2 | Light source 3 | Light source 4 | Light source 5 | Light source 6 |
|---|---|---|---|---|---|---|
| Frequency combination | f1/f2 | f2/f1 | f1/f1 | f2/f2 | f1/f3 | f2/f3 |

It should be noted that the indication relationships between the frequency combinations and the light source sequence numbers in Table 1, Table 2. and Table 3 are merely examples for description. In actual application, another indication relationship may be alternatively used. Examples are not described one by one herein in this embodiment of this application. For example, in Table 2, f1/f1 indicates the light source 1, f2/f2 indicates the light source 2, f1/f2 indicates the light source 3, f2/f1 indicates the light source 4, and f3/f1 indicates the light source 5. In addition, the receiving node needs to preconfigure an indication relationship between a frequency combination and a light source sequence number. After receiving the pilot symbol, the receiving node may determine the light source sequence number indicated by the first light source sequence number indication part of the pilot symbol, or indicated by the first light source sequence number indication part and the second light source sequence number indication part of the pilot symbol.

Further, at least one of every M UPPM symbols of the M×N UPPM symbols includes a total light source quantity field. The total light source quantity field is used to indicate a quantity N of light sources used by the sending node to send the N pilot symbols and the M×N UPPM symbols. M is a positive integer greater than or equal to 1.

S202. The sending node sends the N pilot symbols and the M×N UPPM symbols by using the N light sources, where one light source is used to send one pilot symbol and M UPPM symbols.

The sending node may simultaneously send the N pilot symbols and the M×N UPPM symbols by using the N light sources, or may first send the N pilot symbols and then send the M×N UPPM symbols. The M×N UPPM symbols include original data, and a UPPM symbol sent by using each light source includes a part of the original data, thereby improving transmission efficiency. For example, the to-be-sent original data is divided into N parts based on the quantity N of light sources of the sending node, to obtain N data blocks, and each of the N data blocks is mapped to M UPPM symbols. If a length of 1/N data of the original data is not an integer multiple of N, 0 or 1 is added. N is a positive integer greater than or equal to 2. Optionally, the original data is sequentially and cyclically mapped to the N light sources bit by bit. The original data includes a frame header and a payload that are sent by using a light source. The payload is optional, and some physical frames include only a frame header and do not include a payload. Certainly, the M UPPM symbols sent by using each light source include all the original data. This can effectively reduce a bit error rate.

S203. The receiving node receives X pilot symbols.

Each of the X pilot symbols includes W waveform segments. Each of the W waveform segments includes a first light source sequence number indication part. The first light source sequence number indication part is used to indicate a light source sequence number. Waveforms of waveform segments with odd sequence numbers in the W waveform segments are the same, and waveforms of waveform segments with even sequence numbers in the W waveform segments are the same. Duration of each of the W waveform segments is equal. An average duty cycle of the waveform segments with the odd sequence numbers is a preset duty cycle, and an average duty cycle of the waveform segments with the even sequence numbers is a complementary duty cycle of the preset duty cycle. Alternatively, an average duty cycle of the waveform segments with the odd sequence numbers is a complementary duty cycle of a preset duty cycle, and an average duty cycle of the waveform segments with the even sequence numbers is the preset duty cycle. The X pilot symbols are in a one-to-one correspondence with X light sources. X is a positive integer greater than or equal to 1 and less than or equal to N. In this case, W is a positive integer greater than or equal to 1.

The following describes, by using descriptions of S2031 to S2033, a detailed process of receiving the X pilot symbols by the receiving node.

S2031. The receiving node performs progressive rolling shutter exposure on the sending node at an equal time interval, to obtain video information.

Regardless of whether the receiving node receives a signal at a short distance or a long distance, the receiving node needs to perform progressive rolling shutter exposure on the sending node at an equal time interval, so that a camera may be used to photograph a light source sequence that continuously transmits a UPPM signal and a pilot symbol.

In addition, if the receiving node receives a signal at a short distance, that is, an area of each photographed light source in a video is relatively large, the video includes stripe information. In this case, the camera actively reduces an exposure time to a preset value, for example, 1/10000 s.

S2032. The receiving node obtains a to-be-processed waveform based on the video information.

Specifically, after obtaining the video information, the receiving node processes the video information to obtain the to-be-processed waveform. Optionally, if the obtained video information includes stripe information, mathematical processing is performed on pixels of stripe information of each frame in the video information by row, to obtain the to-be-processed waveform. In a possible implementation, the receiving node may perform summation on stripe information in any frame of the video information by stripe row, to obtain the to-be-processed waveform. Certainly, the receiving node may alternatively perform other processing on stripe information of any frame in the video information, for example, performing processing such as averaging by stripe row, to obtain the to-be-processed waveform.

S2033. Process the to-be-processed waveform to obtain W waveform segments included in each of the X pilot symbols.

After obtaining the to-be-processed waveform, the receiving node may process the to-be-processed waveform to obtain the W waveform segments included in each of the X pilot symbols. As shown in FIG. 5, in a possible implementation, the receiving node may perform digital processing on the to-be-processed waveform to obtain the W waveform segments included in each of the X pilot symbols. In actual application, the receiving node may determine whether an amplitude of the to-be-processed waveform is greater than a first preset threshold; and if the amplitude is greater than the first preset threshold, digitize the waveform into a high level; or if the amplitude is not greater than the first preset threshold, digitize the waveform into a low level. It should be noted that a first preset threshold for each frame of image may be the same or different, and a second preset threshold may be further set to distinguish between delimiters in waveform segments.

S204. The receiving node determines light source sequence numbers of the X light sources based on the X pilot symbols.

The receiving node receives, in parallel, the X pilot symbols sent by the sending node.

For the first possible implementation, a frequency of a pulse width modulation waveform included in a first light source sequence number indication part in each of the X pilot symbols is different, and a frequency of a pulse width modulation waveform included in a first light source sequence number indication part in one pilot symbol indicates one light source. The receiving node determines a light source sequence number of the sending node based on the frequency of the pulse width modulation waveform included in the first light source sequence number indication part. The receiving node receives the X pilot symbols, and may determine the light source sequence numbers of the X light sources based on the X pilot symbols. It should be noted that the receiving node needs to preconfigure an indication relationship between a frequency combination and a light source sequence number. After receiving a pilot symbol, the receiving node may determine a light source sequence number based on a first light source sequence number indication part of the pilot symbol.

For the second possible implementation, a first light source sequence number indication part in each of the X pilot symbols includes a different quantity of pulses, and a quantity of pulses included in a first light source sequence number indication part in one pilot symbol indicates one light source. The receiving node determines a light source sequence number of the sending node based on the quantity of pulses included in the first light source sequence number indication part. The receiving node receives the X pilot symbols, and may determine the light source sequence numbers of the X light sources based on the X pilot symbols. It should be noted that the receiving node needs to preconfigure an indication relationship between a quantity of pulses and a light source sequence number. After receiving a pilot symbol, the receiving node may determine a light source sequence number based on a quantity of pulses in a first light source sequence number indication part of the pilot symbol.

For the third possible implementation, in each of the X pilot symbols, a combination of a frequency of a pulse width modulation waveform included in a first light source sequence number indication part and a frequency of a pulse width modulation waveform included in a second light source sequence number indication part is different. One combination of a frequency of a pulse width modulation waveform included in a first light source sequence number indication part and a frequency of a pulse width modulation waveform included in a second light source sequence number indication part indicates one light source. The receiving node determines a light source sequence number of the sending node based on the combination of the frequency of the pulse width modulation waveform included in the first light source sequence number indication part and the frequency of the pulse width modulation waveform included in the second light source sequence number indication part. The receiving node receives the X pilot symbols, and may determine the light source sequence numbers of the X light sources based on the X pilot symbols. It should be noted that the receiving node needs to preconfigure an indication relationship between a frequency combination and a light source sequence number. After receiving a pilot symbol, the receiving node may determine a light source sequence number based on a first light source sequence number indication part and a second light source sequence number indication part of the pilot symbol.

S205. The receiving node receives M×X UPPM symbols.

Each of the X light sources is used to send M UPPM symbols, and the receiving node may receive M×X UPPM symbols. M is a positive integer greater than or equal to 1.

S206. The receiving node parses the M×X UPPM symbols to obtain original data sent by the sending node by using the N light sources.

After receiving the M×X UPPM symbols, the receiving node first parses the M×X UPPM symbols, and obtains a total quantity of light sources from at least one of every M UPPM symbols. The total quantity of light sources indicates the quantity N of light sources used by the sending node to send the N pilot symbols and the M×N UPPM symbols. Then the receiving node determines whether X is equal to N. If X is equal to N, it indicates that the receiving node receives all the N pilot symbols sent by using the N light sources. The receiving node sequentially combines data included in the M×X UPPM symbols to obtain the original data sent by the sending node by using the N light sources.

For example, the receiving node receives three pilot symbols in parallel, a frequency of a pulse width modulation waveform included in at least one first light source sequence number indication part in a first pilot symbol of the three pilot symbols is f1, a frequency of a pulse width modulation waveform included in at least one first light source sequence number indication part in a second pilot symbol of the three pilot symbols is f2, and a frequency of a pulse width modulation waveform included in at least one first light source sequence number indication part in a third pilot symbol of the three pilot symbols is f3. Because a frequency of a pulse width modulation waveform included in each of a start delimiter and an end delimiter in each of the three pilot symbols is greater than or equal to a preset frequency, for example, a maximum frequency that can be recognized by a camera, a specific pulse waveform cannot be observed in a region of the received start delimiter or a region of the received end delimiter, and only a light spot whose brightness corresponds to a duty cycle of the start delimiter or the end delimiter visible. f1 is greater than 200 Hz and less than the preset frequency. f2 is greater than 200 Hz and less than the preset frequency. f3 is greater than 200 Hz and less than the preset frequency. Therefore, the receiving node may determine that the sending node has three light sources, based on the three frequencies of pulse width modulation waveforms included in first light source sequence number indication parts of the three pilot symbols: f1, f2, and f3. Further, the receiving node determines, based on subsequent M×3 UPPM symbols, that a total quantity of light sources is 3. The receiving node may determine that the sending node includes three light sources, so that the receiving node may parse the M×3 UPPM symbols to obtain original data sent by the sending node by using the three light sources.

If X is less than N, and if the M×X UPPM symbols include the original data, the original data sent by the sending node by using the N light sources may also be obtained based on the M×X UPPM symbols. If original data included in the M×X UPPM symbols is incomplete, the M×X UPPM symbols are not processed, or the M×X UPPM symbols are discarded.

In addition, the M×N UPPM symbols may not include the total light source quantity field, and the receiving node may determine a light source sequence number and a total quantity of light sources based on a frequency of a pulse width modulation waveform included in a first light source sequence number indication part of a pilot symbol. For ease of understanding by a person skilled in the art, examples are used for description herein in this embodiment of this application.

Figure 7:
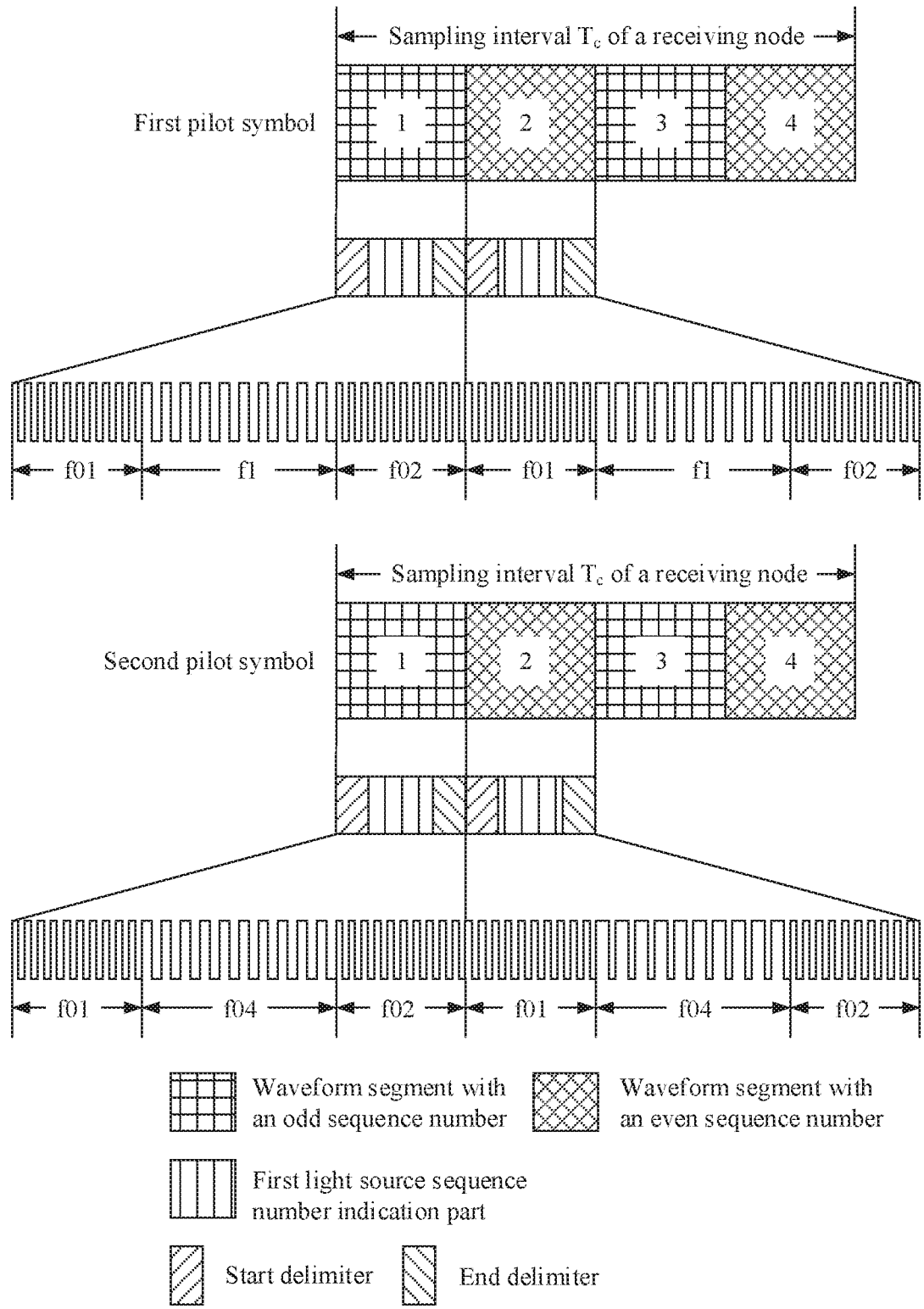
FIG. 7 is a schematic structural diagram of yet another pilot symbol according to an embodiment of this application.

For example, as shown in FIG. 7, when N is equal to 2, frequencies of pulse width modulation waveforms included in all first light source sequence number indication parts in 2 k waveform segments in a first pilot symbol of the two pilot symbols are f1, frequencies of pulse width modulation waveforms included in all first light source sequence number indication parts in 2 k waveform segments in a second pilot symbol of the two pilot symbols are f04, a frequency of a pulse width modulation waveform included in a start delimiter in each of the two pilot symbols is f01, and a frequency of a pulse width modulation waveform included in an end delimiter in each of the two pilot symbols is f02. f01 is greater than or equal to the preset frequency. f02 is greater than or equal to the preset frequency. f1 is greater than 200 Hz and less than the preset frequency. f04 is greater than or equal to the preset frequency. The sending node sends the two pilot symbols by using two light sources. Particularly, in this case, every M UPPM symbols of the M×N UPPM symbols do not need to include a total light source quantity field. When receiving the two pilot symbols and determining that a frequency of a pulse width modulation waveform included in at least one first light source sequence number indication part in one pilot symbol is f04, the receiving node may determine that a quantity of light sources is 2.

Figure 8:
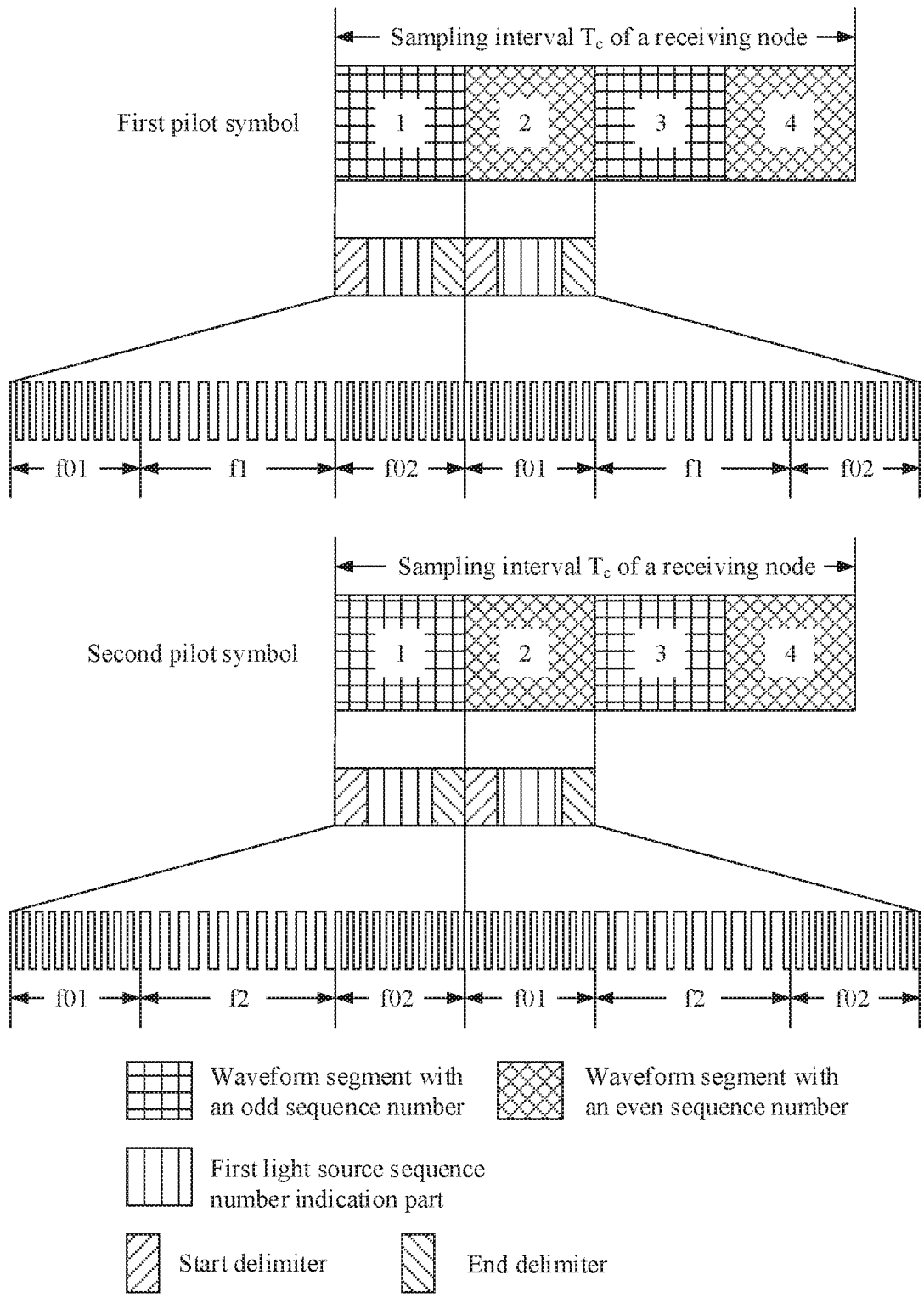
FIG. 8 is a schematic structural diagram of yet another pilot symbol according to an embodiment of this application.

For example, as shown in FIG. 8, when N is equal to 2, frequencies of pulse width modulation waveforms included in all first light source sequence number indication parts in 2 k waveform segments in a first pilot symbol of the two pilot symbols are f1, frequencies of pulse width modulation waveforms included in all first light source sequence number indication parts in 2 k waveform segments in a second pilot symbol of the two pilot symbols are f2, a frequency of a pulse width modulation waveform included in a start delimiter in each of the two pilot symbols is f01, and a frequency of a pulse width modulation waveform included in an end delimiter in each of the two pilot symbols is f02, f01 is greater than or equal to the preset frequency. f02 is greater than or equal to the preset frequency. f1 is greater than 200 Hz and less than the preset frequency. f2 is greater than 200 Hz and less than the preset frequency. The sending node sends the two pilot symbols by using two light sources. Particularly, in this case, every M UPPM symbols of the M×N UPPM symbols do not need to include a total light source quantity field. When receiving the two pilot symbols, and determining that a frequency of a pulse width modulation waveform included in at least one first light source sequence number indication part in one pilot symbol is f1 and a frequency of a pulse width modulation waveform included in at least one first light source sequence number indication part in the other pilot symbol is f2, the receiving node may determine that a quantity of light sources is 2.

Figure 9C:
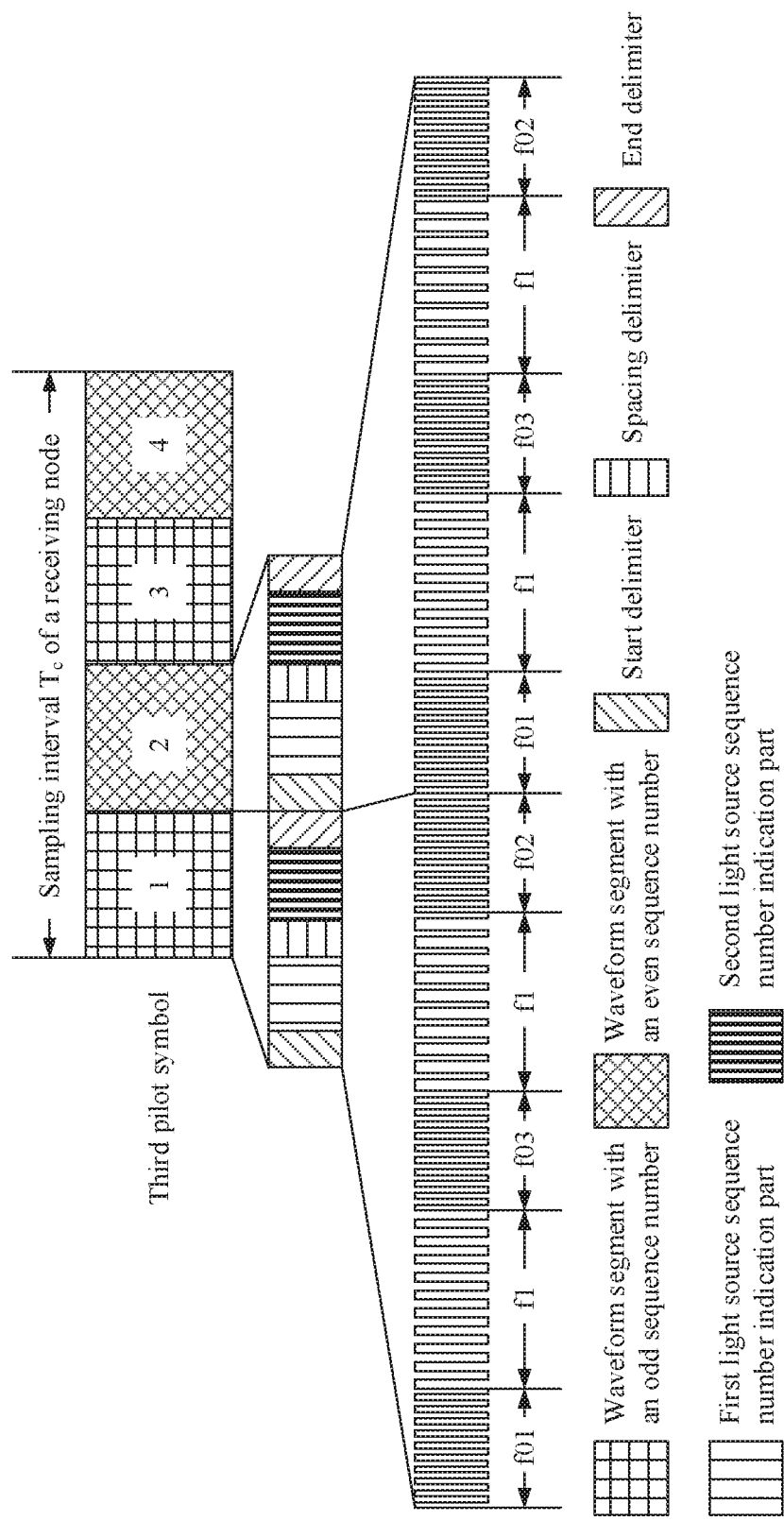
Figure 10D:
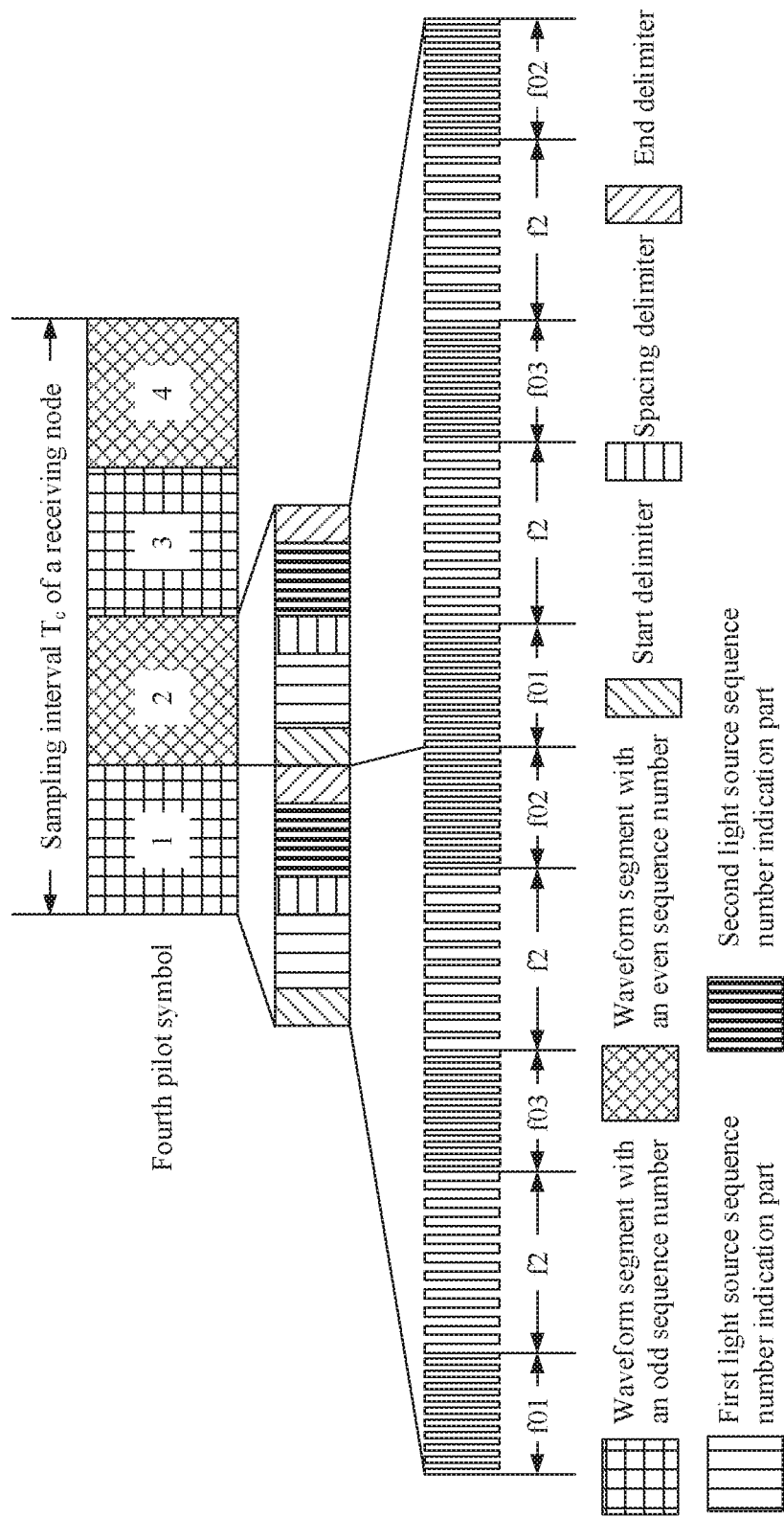

When N is equal to 3, as shown in FIG. 9A, FIG. 9B, and FIG. 9C, in each of the three pilot symbols, a frequency of a pulse width modulation waveform included in a start delimiter is f01, a frequency of a pulse width modulation waveform included in a spacing delimiter is f03, and a frequency of a pulse width modulation waveform included in an end delimiter is f02. f01 is greater than or equal to the preset frequency. f02 is greater than or equal to the preset frequency. f03 is greater than or equal to the preset frequency. In 2 k waveform segments in a first pilot symbol of the three pilot symbols, frequencies of pulse width modulation waveforms included in all first light source sequence number indication parts are f1, and frequencies of pulse width modulation waveforms included in all second light source sequence number indication parts are f05. In 2 k waveform segments in a second pilot symbol of the three pilot symbols, frequencies of pulse width modulation waveforms included in all first light source sequence number indication parts are f05, and frequencies of pulse width modulation waveforms included in all second light source sequence number indication parts are f1. In 2 k waveform segments in a third pilot symbol of the three pilot symbols, frequencies of pulse width modulation waveforms included in all first light source sequence number indication parts are f1, and frequencies of pulse width modulation waveforms included in all second light source sequence number indication parts are f1. f1 is greater than 200 Hz and less than the preset frequency. f05 is greater than or equal to the preset frequency. The sending node sends the three pilot symbols by using three light sources. Particularly, in this case, every M UPPM symbols of the M×N UPPM symbols do not need to include a total light source quantity field. When receiving the three pilot symbols, and determining that a frequency of a pulse width modulation waveform included in at least one first light source sequence number indication part in two of the pilot symbols is f05 or a frequency of a pulse width modulation waveform included in at least one second light source sequence number indication part in two of the pilot symbols is f05, the receiving node may determine that a quantity of light sources is 3.

When N is equal to 4, as shown in FIG. 10A, FIG. 10B, FIG. 10C, and FIG. 10D, in 2 k waveform segments in a first pilot symbol of the four pilot symbols, a frequency of a pulse width modulation waveform included in each first light source sequence number indication part is f1, and a frequency of a pulse width modulation waveform included in each second light source sequence number indication part is f2. In 2 k waveform segments in a second pilot symbol of the four pilot symbols, a frequency of a pulse width modulation waveform included in each first light source sequence number indication part is f2, and a frequency of a pulse width modulation waveform included in each second light source sequence number indication part is f1. In 2 k waveform segments in a third pilot symbol of the four pilot symbols, a frequency of a pulse width modulation waveform included in each first light source sequence number indication part is f1, and a frequency of a pulse width modulation waveform included in each second light source sequence number indication part is f1. In 2 k waveform segments in a fourth pilot symbol of the four pilot symbols, a frequency of a pulse width modulation waveform included in each first light source sequence number indication part is f2, and a frequency of a pulse width modulation waveform included in each second light source sequence number indication part is f2. f1 is greater than 200 Hz and less than the preset frequency. f2 is greater than 200 Hz and less than the preset frequency. The sending node sends the four pilot symbols by using four light sources. Particularly, in this case, every M UPPM symbols of the M×N UPPM symbols do not need to include a total light source quantity field. When receiving the four pilot symbols and determining that there are two frequencies in the four pilot symbols, the receiving node may determine that a quantity of light sources is 4.

According to the camera communication method provided in this embodiment of this application, the pilot symbols are added to a frame structure of a frame to be sent by the sending node, and the pilot symbols are used to indicate light source sequence numbers of the N light sources. The sending node simultaneously sends the UPPM symbols in parallel by using a plurality of light sources, so that after learning the light source sequence numbers, the receiving node (the camera) may extract, from different pixel regions, the UPPM symbols sent by using light sources with different sequence numbers, and further restore the original data sent by the sending node. This implements simultaneous transmission of the UPPM symbols by using the N light sources, and improves transmission efficiency.

In addition, when N is greater than or equal to 8, each of 2 k waveform segments of each pilot symbol may include three light source sequence number indication parts and two spacing delimiters. A first light source sequence number indication part, a second light source sequence number indication part, and a third light source sequence number indication part are used to jointly indicate a light source sequence number. A first spacing delimiter is used to separate the first light source sequence number indication part from the second light source sequence number indication part. A second spacing delimiter is used to separate the second light source sequence number indication part from the third light source sequence number indication part. The sending node may set three different frequencies for pulse width modulation waveforms included in the three light source sequence number indication parts, or may set two frequencies. This is not limited in this embodiment of this application, provided that the frequencies can indicate the N light sources included in the sending node. The receiving node determines a quantity of light sources of the sending node based on the frequencies of the pulse width modulation waveforms included in the three light source sequence number indication parts. Compared with the foregoing embodiments, in this embodiment of this application, a structure of each pilot symbol is different, and light source sequence numbers are indicated by different combinations of the frequencies of the pulse width modulation waveforms included in the three light source sequence number indication parts. For other features, refer to detailed descriptions in the foregoing embodiments. Details are not described in this embodiment of this application again.

Particularly, camera positioning may be further performed according to the camera communication method in this embodiment of this application. If a light spot of a light source is not sufficiently large, the receiving node cannot correctly receive a complete waveform, and therefore cannot extract a signal. However, because a pilot symbol is used to send pulse width modulation signals at a same frequency in an entire symbol period, the camera may determine a light source sequence number based on frequencies of some received pulse width modulation signals. If a relationship between a light source sequence number and a light source location is known, the receiving node may perform positioning by using an angle of arrival (Angle-of-Arrival, AOA) method based on angle of arrival information and light source sequence number information in an obtained picture.

The foregoing mainly describes the solutions provided in the embodiments of this application from a perspective of interaction between the network elements. It may be understood that, to implement the foregoing functions, each of network elements, for example, the sending node or the receiving node, includes corresponding hardware structures and/or software modules for performing the functions. A person skilled in the art should easily be aware that, in combination with algorithm steps of the examples described in the embodiments disclosed in this specification, the embodiments of this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such an implementation goes beyond the scope of this application.

In the embodiments of this application, functional modules in sending node and the receiving node may be obtained through division based on the foregoing method examples. For example, functional modules may be obtained through division in correspondence with functions, or two or more functions may be integrated into one processing module. The integrated module may be implemented in a form of hardware, or may be implemented in a form of a software functional module. It should be noted that, in the embodiments of this application, module division is an example, and is merely logical function division. During actual implementation, another division manner may be used.

Figure 11:
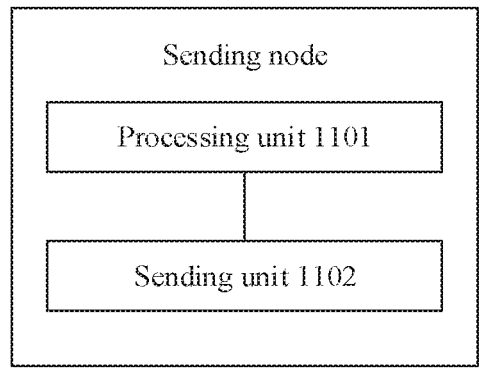
FIG. 11 is a schematic structural diagram of a sending node according to an embodiment of this application.

When each functional module is obtained through division based on each corresponding function, FIG. 11 is a possible schematic composition diagram of the sending node in the foregoing embodiments. As shown in FIG. 11, the sending node may include a processing unit 1101 and a sending unit 1102.

The processing unit 1101 is configured to support the sending node in performing S201 in the communication method shown in FIG. 2.

The sending unit 1102 is configured to support the sending node in performing S202 in the communication method shown in FIG. 2.

It should be noted that all related content of the steps in the foregoing method embodiments may be cited in function descriptions of corresponding function modules. Details are not described herein again.

The sending node provided in this embodiment of this application is configured to perform the foregoing communication method. Therefore, an effect that is the same as that of the foregoing communication method can be achieved.

Figure 12:
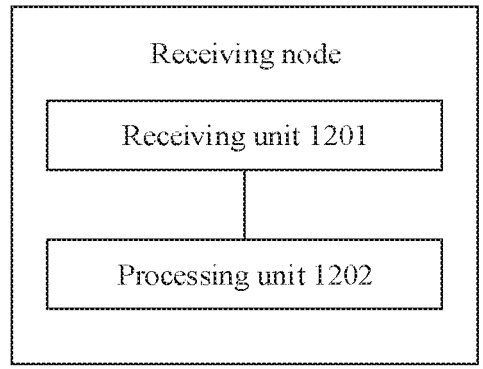
FIG. 12 is a schematic structural diagram of a receiving node according to an embodiment of this application.

When each functional module is obtained through division based on each corresponding function, FIG. 12 is a possible schematic composition diagram of the receiving node in the foregoing embodiments. As shown in FIG. 12, the receiving node may include a receiving unit 1201 and a processing unit 1202.

The receiving unit 1201 is configured to support the receiving node in performing S203 and S205 in the communication method shown in FIG. 2.

The processing unit 1202 is configured to support the receiving node in performing S204 and S206 in the communication method shown in FIG. 2.

It should be noted that all related content of the steps in the foregoing method embodiments may be cited in function descriptions of corresponding function modules. Details are not described herein again.

The receiving node provided in this embodiment of this application is configured to perform the foregoing communication method. Therefore, an effect that is the same as that of the foregoing communication method can be achieved.

Figure 13:
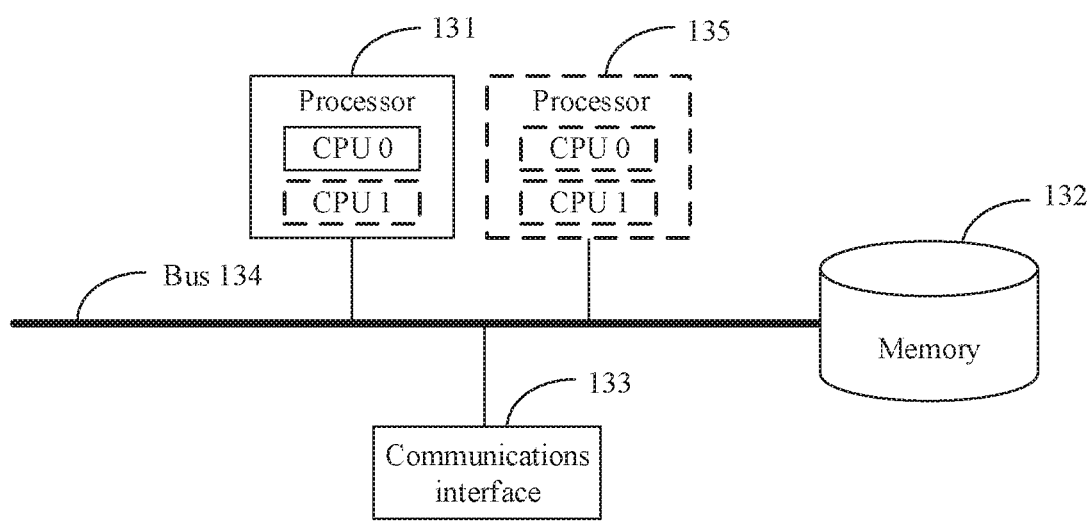
FIG. 13 is a schematic diagram of components of a computer device according to an embodiment of this application.

FIG. 13 is a schematic composition diagram of a computer device according to an embodiment of this application. As shown in FIG. 13, the computer device may include at least one processor 131, a memory 132, a communications interface 133, and a communications bus 134.

Components of the computer device are specifically described below with reference to FIG. 13.

The processor 131 is a control center of the computer device, and may be one processor, or may be a collective name of a plurality of processing elements. During specific implementation, in an embodiment, the processor 131 may include one central processing unit (Central Processing Unit, CPU) or a plurality of CPUs, for example, a CPU 0 and a CPU 1 shown in FIG. 13, For example, the processor 131 may be an application specific integrated circuit (Application Specific Integrated Circuit, ASIC), or may be one or more integrated circuits configured to implement this embodiment of this application, for example, one or more microprocessors or (digital signal processor, DSP) or one or more field programmable gate arrays (Field Programmable Gate Array, FPGA).

For example, the processor 131 is one or more CPUs. The processor 131 may perform various functions of the computer device by running or executing a software program stored in the memory 132 and invoking data stored in the memory 132.

During specific implementation, in an embodiment, the computer device may include a plurality of processors, for example, the processor 131 and a processor 135 shown in FIG. 13. Each of the processors may be a single-core processor (single-CPU) or may be a multi-core processor (multi-CPU). The processor herein may be one or more devices, circuits, and/or processing cores for processing data (for example, computer program instructions).

In an implementable manner of this embodiment of this application, the computer device may be a sending node, and the processor 131 is mainly configured to generate N pilot symbols and M×N UPPM symbols.

In another implementable manner of this embodiment of this application, the computer device may be a receiving node, and the processor 131 is mainly configured to: determine light source sequence numbers of N light sources based on the N pilot symbols, and parse the M×N UPPM symbols to obtain original data sent by the sending node by using the N light sources.

It should be noted that all related content of the steps in the foregoing method embodiments may be cited in function descriptions of corresponding functional modules. Details are not described herein again.

The receiving node or sending node provided in this embodiment of this application is configured to perform the foregoing communication method. Therefore, an effect that is the same as that of the foregoing communication method can be achieved.

The memory 132 may be a read-only memory (Read-Only Memory, ROM) or another type of static storage device capable of storing static information and an instruction, a random access memory (Random Access Memory, RAM) or another type of dynamic storage device capable of storing information and an instruction, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that is capable of carrying or storing expected program code in a form of an instruction or a data structure and that can be accessed by a computer. However, this application is not limited thereto. The memory 132 may exist independently and is connected to the processor 131 by using the communications bus 134. Alternatively, the memory 132 may be integrated with the processor 131.

The memory 132 is configured to store a software program that performs the solution of this application, and the processor 131 controls execution of the software program.

The communications interface 133 is configured to communicate, by using any apparatus such as a transceiver, with another device or a communications network such as Ethernet, a radio access network (Radio Access Network, RAN), or a wireless local area network (Wireless Local Area Network, WLAN). The communications interface 133 may include a receiving unit for implementing a receiving function and a sending unit for implementing a sending function.

The communications bus 134 may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 13, but this does not mean that there is only one bus or only one type of bus.

A structure of the device shown in FIG. 13 does not constitute a limitation on the computer device. The computer device may include components more or fewer than those shown in the figure, or may combine some components, or may have different component arrangements. For example, in the embodiments of this application, an LED array or an LID array may further be included.

Figure 14:
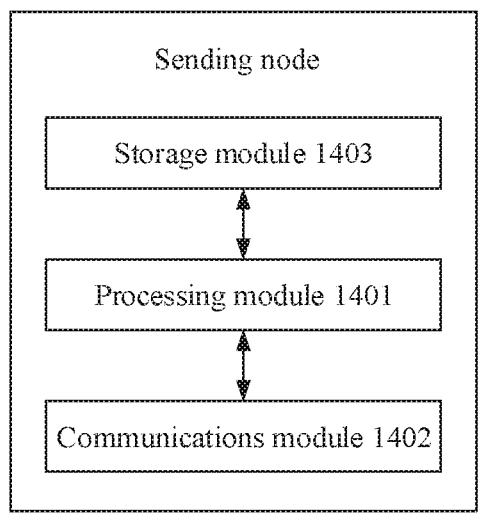
FIG. 14 is a schematic structural diagram of another sending node according to an embodiment of this application.

When an integrated unit is used, FIG. 14 is another possible schematic composition diagram of the sending node in the foregoing embodiments. As shown in FIG. 14, the sending node includes a processing module 1401 and a communications module 1402.

The processing module 1401 is configured to control and manage an action of the sending node. For example, the processing module 1401 is configured to support the sending node in performing S201 in FIG. 2, and/or is configured to perform another process of the technology described in this specification. The communications module 1402 is configured to support communication between the sending node and another network entity. Specifically, for example, the communications module 1402 is configured to support the sending node in performing S203 in FIG. 2. The sending node may further include a storage module 1403, configured to store program code and data of the sending node.

The processing module 1401 may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 1402 may be a transceiver, a transceiver circuit, a communications interface, or the like. The storage module 1403 may be a memory.

When the processing module 1401 is a processor, the communications module 1402 is a communications interface, and the storage module 1403 is a memory, the sending node in this embodiment of this application may be the computer device shown in FIG. 13.

Figure 15:
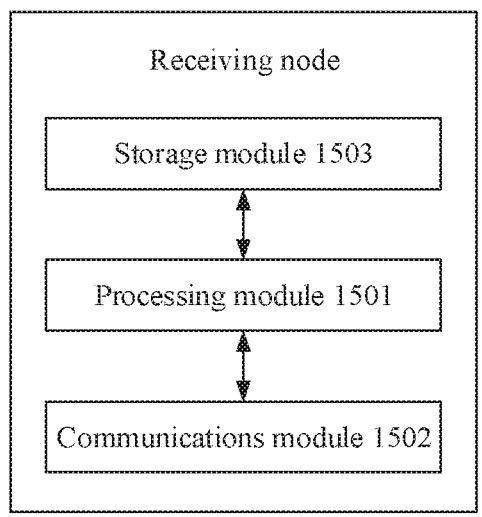
FIG. 15 is a schematic structural diagram of another receiving node according to an embodiment of this application.

When an integrated unit is used, FIG. 15 is another possible schematic composition diagram of the receiving node in the foregoing embodiments. As shown in FIG. 15, the receiving node includes a processing module 1501 and a communications module 1502.

The processing module 1501 is configured to control and manage an action of the receiving node. For example, the processing module 1501 is configured to support the receiving node in performing S204 and S206 in FIG. 2, and/or is configured to perform another process of the technology described in this specification. The communications module 1502 is configured to support communication between the receiving node and another network entity. Specifically, for example, the communications module 1502 is configured to support the receiving node in performing S203 and S205 in FIG. 2. The receiving node may further include a storage module 1503, configured to store program code and data of the receiving node.

The processing module 1501 may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 1502 may be a transceiver, a transceiver circuit, a communications interface, or the like. The storage module 1503 may be a memory.

When the processing module 1501 is a processor, the communications module 1502 is a communications interface, and the storage module 1503 is a memory, the receiving node in this embodiment of this application may be the computer device shown in FIG. 13.

According to the foregoing descriptions about implementations, a person skilled in the art can clearly understand that, for ease of convenient and brief description, division of the foregoing functional modules is used as an example for illustration. In actual application, the foregoing functions can be allocated to different modules and implemented as required, that is, an inner structure of an apparatus is divided into different functional modules to implement all or some of the functions described above.

In the several embodiments provided in this application, it should be understood that the disclosed apparatuses and methods may be implemented in other manners. For example, the described apparatus embodiments are merely examples. For example, the module or unit division is merely logical function division. During actual implementation, there may be other division manners. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, in other words, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A camera communication method, wherein the method is applied to a receiving node, and the method comprises:
    receiving X pilot symbols, wherein each of the X pilot symbols comprises W waveform segments, each of the W waveform segments comprises a first light source sequence number indication part, the first light source sequence number indication part indicates a light source sequence number,
    waveforms of waveform segments with odd sequence numbers in the W waveform segments are the same,
    waveforms of waveform segments with even sequence numbers in the W waveform segments are the same,
    a duration of each of the W waveform segments is equal,
    an average duty cycle of the waveform segments with the odd sequence numbers is a preset duty cycle, and an average duty cycle of the waveform segments with the even sequence numbers is a complementary duty cycle of the preset duty cycle, or
    the average duty cycle of the waveform segments with the odd sequence numbers is the complementary duty cycle of the preset duty cycle and the average duty cycle of the waveform segments with the even sequence numbers is the preset duty cycle,
    the X pilot symbols are in a one-to-one correspondence with X light sources, where X is a positive integer greater than or equal to 1 and less than or equal to N, and W is a positive integer greater than or equal to 1;
    determining light source sequence numbers of the X light sources based on the X pilot symbols;

receiving M×X undersampled pulse width modulation-based pulse position modulation (UPPM) symbols, where M is a positive integer greater than or equal to 1; and parsing the M×X UPPM symbols thereby obtaining original data from a sending node by using N light sources.

2. The method according to claim 1, wherein the receiving X pilot symbols comprises:

performing progressive rolling shutter exposure on the sending node at an equal time interval, thereby obtaining video information;

obtaining a to-be-processed waveform based on the video information; and processing the to-be-processed waveform thereby obtaining the W waveform segments comprised in each of the X pilot symbols.

3. A receiving node, comprising:

a receiver, configured to receive X pilot symbols, wherein each of the X pilot symbols comprises W waveform segments, each of the W waveform segments comprises a first light source sequence number indication part, the first light source sequence number indication part indicates a light source sequence number, waveforms of waveform segments with odd sequence numbers in the W waveform segments are the same, waveforms of waveform segments with even sequence numbers in the W waveform segments are the same, a duration of each of the W waveform segments is equal, an average duty cycle of the waveform segments with the odd sequence numbers is a preset duty cycle, and an average duty cycle of the waveform segments with the even sequence numbers is a complementary duty cycle of the preset duty cycle, or the average duty cycle of the waveform segments with the odd sequence numbers is the complementary duty cycle of the preset duty cycle and the average duty cycle of the waveform segments with the even sequence numbers is the preset duty cycle, the X pilot symbols are in a one-to-one correspondence with X light sources, where X is a positive integer greater than or equal to 1 and less than or equal to N, and W is a positive integer greater than or equal to 1; and a processor, configured to determine light source sequence numbers of the X light sources based on the X pilot symbols, wherein the receiver is further configured to receive M×X undersampled pulse width modulation-based pulse position modulation (UPPM) symbols, where M is a positive integer greater than or equal to 1; and the processor is further configured to parse the M×X UPPM symbols thereby obtaining original data from a sending node by using N light sources.

4. The receiving node according to claim 3, wherein the receiver configured to receive X pilot symbols comprises the receiver being configured to:

perform progressive rolling shutter exposure on the sending node at an equal time interval, thereby obtaining video information;

obtain a to-be-processed waveform based on the video information; and process the to-be-processed waveform thereby obtaining W waveform segments comprised in each of the X pilot symbols.

5. The receiving node according to claim 4, wherein each of the W waveform segments further comprises:

a start delimiter, and an end delimiter; wherein the start delimiter indicates a start of the waveform segment in which the start delimiter is located; and the end delimiter indicates an end of the waveform segment in which the end delimiter is located.

6. The receiving node according to claim 5, wherein each of an average duty cycle of start delimiters comprised in the waveform segments with the odd sequence numbers in the W waveform segments, an average duty cycle of first light source sequence number indication parts comprised in the waveform segments with the odd sequence numbers in the W waveform segments, and an average duty cycle of end delimiters comprised in the waveform segments with the odd sequence numbers in the W waveform segments are the same as the preset duty cycle, and each of an average duty cycle of start delimiters comprised in the waveform segments with the even sequence numbers in the W waveform segments, an average duty cycle of first light source sequence number indication parts comprised in the waveform segments with the even sequence numbers in the W waveform segments, and an average duty cycle of end delimiters comprised in the waveform segments with the even sequence numbers in the W waveform segments are the same as the complementary duty cycle of the preset duty cycle; or each of the average duty cycle of start delimiters comprised in the waveform segments with the odd sequence numbers in the W waveform segments, the average duty cycle of first light source sequence number indication parts comprised in the waveform segments with the odd sequence numbers in the W waveform segments, and the average duty cycle of end delimiters comprised in the waveform segments with the odd sequence numbers in the W waveform segments are the same as the complementary duty cycle of the preset duty cycle, and each of the average duty cycle of start delimiters comprised in the waveform segments with the even sequence numbers in the W waveform segments, the average duty cycle of first light source sequence number indication parts comprised in the waveform segments with the even sequence numbers in the W waveform segments, and the average duty cycle of end delimiters comprised in the waveform segments with the even sequence numbers in the W waveform segments are the same as the preset duty cycle.

7. The receiving node according to claim 6, wherein the duration of each of the W waveform segments is $T_s$, where $T_s=T_{sd}+T_{li1}+T_{ed}=T_c/2$ k, wherein $T_{sd}$ represents a duration of the start delimiter, $T_{li1}$ represents a duration of the first light source sequence number indication part, $T_{ed}$ represents a duration of the end delimiter, $T_c$ represents a sampling interval of the receiving node, the start delimiter comprises Q pulses, a width of each of the Q pulses is less than a first threshold, the end delimiter comprises P pulses, a width of each of the P pulses is less than a second threshold, Q is an integer greater than or equal to 1, P is an integer greater than or equal to 1, and k is a positive integer greater than or equal to 1.

8. The receiving node according to claim 7, wherein frequencies of pulse width modulation waveforms comprised in each first light source sequence number indication parts in the W waveform segments in one pilot symbol are the same, and frequencies of pulse width modulation waveforms comprised in first light source sequence number indication parts in different pilot symbols are different, the frequency of the pulse width modulation waveform comprised in the first light source sequence number indication part is one of N frequencies, the N frequencies are different from each other, the frequency of the pulse width modulation waveform comprised in the first light source sequence number indication part is greater than 200 Hz and less than a preset frequency, a frequency of a pulse width modulation waveform comprised in the start delimiter is f01, a frequency of a pulse width modulation waveform comprised in the end delimiter is f02, where f01 is greater than or equal to the preset frequency, and f02 is greater than or equal to the preset frequency.

9. The receiving node according to claim 8, wherein frequencies of pulse width modulation waveforms comprised in each first light source sequence number indication parts in the W waveform segments in one of the two pilot symbols are f1 in response to N being equal to 2, and frequencies of pulse width modulation waveforms comprised in all first light source sequence number indication parts in the W waveform segments in the other one of the two pilot symbols are f2 in response to N being equal to 2, where f1 is greater than 200 Hz and less than the preset frequency, and f2 is greater than 200 Hz and less than the preset frequency.

10. The receiving node according to claim 7, wherein a quantity of pulses comprised in the first light source sequence number indication part indicates a light source sequence number, each of the first light source sequence number indication parts in the W waveform segments in one pilot symbol comprise a same quantity of pulses, and first light source sequence number indication parts in different pilot symbols comprise different quantities of pulses.

11. The receiving node according to claim 7, wherein
a frequency of a pulse width modulation waveform comprised in the first light source sequence number indication part indicates a light source sequence number,
frequencies of pulse width modulation waveforms comprised in each first light source sequence number indication parts in the W waveform segments in one pilot symbol are the same,
frequencies of pulse width modulation waveforms comprised in first light source sequence number indication parts in different pilot symbols are different, and
frequencies of pulse width modulation waveforms comprised in each first light source sequence number indication parts in the W waveform segments in one of the two pilot symbols are f1 in response to N being equal to 2, frequencies of pulse width modulation waveforms comprised in each first light source sequence number indication parts in the W waveform segments in the other one of the two pilot symbols are f04 in response to N being equal to 2,
a frequency of a pulse width modulation waveform comprised in a start delimiter in each of the two pilot symbols is f01, a frequency of a pulse width modulation waveform comprised in an end delimiter in each of the two pilot symbols is f02, where f01 is greater than or equal to a preset frequency, f02 is greater than or equal to the preset frequency, f1 is greater than 200 Hz and less than the preset frequency, and f04 is greater than or equal to the preset frequency.

12. The receiving node according to claim 6, wherein each of the W waveform segments further comprises a second light source sequence number indication part and a spacing delimiter, wherein the first light source sequence number indication part and the second light source sequence number indication part are jointly indicate a light source sequence number, and the spacing delimiter separates the first light source sequence number indication part from the second light source sequence number indication part, in response to N being greater than or equal to 3.

13. The receiving node according to claim 12, wherein
each of an average duty cycle of second light source sequence number indication parts comprised in the waveform segments with the odd sequence numbers in the W waveform segments, and an average duty cycle of spacing delimiters comprised in the waveform segments with the odd sequence numbers in the W waveform segments are the same as the preset duty cycle, and
each of an average duty cycle of second light source sequence number indication parts comprised in the waveform segments with the even sequence numbers in the W waveform segments, and an average duty cycle of spacing delimiters comprised in the waveform segments with the even sequence numbers in the W waveform segments are the same as the complementary duty cycle of the preset duty cycle; or
each of the average duty cycle of second light source sequence number indication parts comprised in the waveform segments with the odd sequence numbers in the W waveform segments, and the average duty cycle of spacing delimiters comprised in the waveform segments with the odd sequence numbers in the W waveform segments are the same as the complementary duty cycle of the preset duty cycle, and
each of the average duty cycle of second light source sequence number indication parts comprised in the waveform segments with the even sequence numbers in the W waveform segments, and the average duty cycle of spacing delimiters comprised in the waveform segments with the even sequence numbers in the W waveform segments are the same as the preset duty cycle.

14. The receiving node according to claim 13, wherein the duration of each of the W waveform segments is $T_s$, where $T_s = T_{sd} + T_{li2} + T_{id} + T_{li3} + T_{ed} = T_c/2$ k, wherein $T_{sd}$ represents a duration of the start delimiter, $T_{li2}$ represents a duration of the first light source sequence number indication part, $T_{id}$ represents a duration of the spacing delimiter, $T_{li3}$ represents a duration of the second light source sequence number indication part, $T_{ed}$ represents a duration of the end delimiter, $T_c$ represents a sampling interval of the receiving node, the start delimiter comprises A pulses, a width of each of the A pulses is less than a first threshold, the end delimiter comprises B pulses, a width of each of the B pulses is less than a second threshold, the spacing delimiter comprises C pulses, a width of each of the C pulses is less than a third threshold, A is an integer greater than or equal to 1, B is an integer greater than or equal to 1, C is an integer greater than or equal to 0, and k is a positive integer greater than or equal to 1.

15. The receiving node according to claim 14, wherein
different combinations of a frequency of a pulse width modulation waveform comprised in a first light source sequence number indication part and a frequency of a pulse width modulation waveform comprised in a second light source sequence number indication part indicate a light source sequence number,
the frequency of the pulse width modulation waveform comprised in the first light source sequence number indication part is one of E frequencies, the frequency of the pulse width modulation waveform comprised in the second light source sequence number indication part is one of R frequencies, the E frequencies are different from each other, the R frequencies are different from each other,
the frequency of the pulse width modulation waveform comprised in the first light source sequence number indication part is greater than 200 Hz and less than a preset frequency, the frequency of the pulse width modulation waveform comprised in the second light source sequence number indication part is greater than 200 Hz and less than the preset frequency, a frequency of a pulse width modulation waveform comprised in the start delimiter is f01, a frequency of a pulse width modulation waveform comprised in the spacing delimiter is f03, a frequency of a pulse width modulation waveform comprised in the end delimiter is f02, where f01 is greater than or equal to the preset frequency, f02 is greater than or equal to the preset frequency, and f03 is greater than or equal to the preset frequency.

16. The receiving node according to claim 15, wherein in the W waveform segments in a first pilot symbol of the four pilot symbols, a frequency of a pulse width modulation waveform comprised in each first light source sequence number indication part is f1 in response to N being equal to 4, and a frequency of a pulse width modulation waveform comprised in each second light source sequence number indication part is f2 in response to N being equal to 4;

in the W waveform segments in a second pilot symbol of the four pilot symbols, a frequency of a pulse width modulation waveform comprised in each first light source sequence number indication part is f2 in response to N being equal to 4, and a frequency of a pulse width modulation waveform comprised in each second light source sequence number indication part is f1 in response to N being equal to 4;

in the W waveform segments in a third pilot symbol of the four pilot symbols, a frequency of a pulse width modulation waveform comprised in each first light source sequence number indication part is f1 in response to N being equal to 4, and a frequency of a pulse width modulation waveform comprised in each second light source sequence number indication part is f1 in response to N being equal to 4; and in the W waveform segments in a fourth pilot symbol of the four pilot symbols, a frequency of a pulse width modulation waveform comprised in each first light source sequence number indication part is f2 in response to N being equal to 4, and a frequency of a pulse width modulation waveform comprised in each second light source sequence number indication part is f2 in response to N being equal to 4, wherein f1 is greater than 200 Hz and less than the preset frequency, and f2 is greater than 200 Hz and less than the preset frequency.

17. The receiving node according to claim 14, wherein in each of three pilot symbols, a frequency of a pulse width modulation waveform comprised in a start delimiter is f01 in response to N being equal to 3, a frequency of a pulse width modulation waveform comprised in a spacing delimiter is f03 in response to N being equal to 3, and a frequency of a pulse width modulation waveform comprised in an end delimiter is f02 in response to N being equal to 3, where f01 is greater than or equal to a preset frequency, f02 is greater than or equal to a preset frequency, and f03 is greater than or equal to the preset frequency;

in the W waveform segments in a first pilot symbol of the three pilot symbols, frequencies of pulse width modulation waveforms comprised in each first light source sequence number indication parts are f1, and frequencies of pulse width modulation waveforms comprised in each second light source sequence number indication parts are f05;

in the W waveform segments in a second pilot symbol of the three pilot symbols, frequencies of pulse width modulation waveforms comprised in each first light source sequence number indication parts are f05, and frequencies of pulse width modulation waveforms comprised in each second light source sequence number indication parts are f1; and in the W waveform segments in a third pilot symbol of the three pilot symbols, frequencies of pulse width modulation waveforms comprised in each first light source sequence number indication parts are f1, and frequencies of pulse width modulation waveforms comprised in each second light source sequence number indication parts are f1, where f1 is greater than 200 Hz and less than the preset frequency, and f05 is greater than or equal to the preset frequency.

18. The receiving node according to claim 3, wherein at least one of every M UPPM symbols of the M×N UPPM symbols comprises a total light source quantity field, the total light source quantity field indicates a quantity N of light sources useable by the sending node to send the N pilot symbols and the M×N UPPM symbols.

19. The receiving node according to claim 3, wherein the processor is further configured to parse the M×X UPPM symbols further includes the processor configured to obtain a total quantity of light sources, wherein the total light source quantity field is used to represents the quantity N of light sources useable by the sending node to send the N pilot symbols and the M×N UPPM symbols; and the processor is further configured to:
determine whether X is equal to N; and
obtain, based on the M×X UPPM symbols, the original data sent by the sending node by using the N light sources, in response to X being equal to N.

20. The receiving node according to claim 3, wherein a duration of each of the N pilot symbols is a sampling interval of the receiving node.

* * * * *